(12) United States Patent
Tong et al.

(10) Patent No.: US 11,129,766 B2
(45) Date of Patent: Sep. 28, 2021

(54) FLEXIBLY DRIVEN ROBOTIC HANDS

(71) Applicant: The Chinese University of Hong Kong, Hong Kong (CN)

(72) Inventors: Kai Yu Tong, Hong Kong (CN); Zheng Li, Hong Kong (CN); Ho Lam Heung, Hong Kong (CN); Trivoramai Jiralerspong, Phuket (TH); Choi Ling Wong, Kowloon (CN)

(73) Assignee: THE CHINESE UNIVERSITY OF HONG KONG, Hong Kong (CN)

( * ) Notice: Subject to any disclaimer, the term of this patent is extended or adjusted under 35 U.S.C. 154(b) by 0 days.

(21) Appl. No.: 15/488,121

(22) Filed: Apr. 14, 2017

(65) Prior Publication Data

US 2018/0296419 A1    Oct. 18, 2018

(51) Int. Cl.
*A61H 1/02* (2006.01)
*B25J 9/00* (2006.01)
*B25J 9/14* (2006.01)

(52) U.S. Cl.
CPC .............. *A61H 1/02* (2013.01); *A61H 1/0285* (2013.01); *A61H 1/0288* (2013.01); *B25J 9/0006* (2013.01); *B25J 9/142* (2013.01); *A61H 2001/0207* (2013.01); *A61H 2201/0103* (2013.01); *A61H 2201/1409* (2013.01); *A61H 2201/165* (2013.01);
(Continued)

(58) Field of Classification Search
CPC ...... A61H 1/02; A61H 1/0285; A61H 1/0288; A61H 2001/0207; A61H 2201/0207; A61H 2201/1409; A61H 2201/1635; A61H 2230/505; A61H 2201/165; A61H 2201/5069; A61H 2201/5071; A61H 2230/105; A61H 2230/605; A61F 4/00; A61F 5/013; A61F 2002/74; A61F 2002/745; F15B 15/103; B25J 15/0023
See application file for complete search history.

(56) References Cited

U.S. PATENT DOCUMENTS

| 3,981,528 A | * | 9/1976 | Andorf | ................ B25J 15/0023 |
| | | | | 294/119.3 |
| 4,644,938 A | * | 2/1987 | Yates | ................... A61H 1/0288 |
| | | | | 482/901 |

(Continued)

FOREIGN PATENT DOCUMENTS

| CN | 1613618 A | 5/2005 |
| CN | 201194898 Y | 2/2009 |

(Continued)

OTHER PUBLICATIONS

International Search Report dated Jun. 7, 2018 in International Application No. PCT/CN2018/080804, with its Written Opinion.

(Continued)

*Primary Examiner* — Christie L Bahena
(74) *Attorney, Agent, or Firm* — Saliwanchik, Lloyd & Eisenschenk

(57) ABSTRACT

Systems and methods for robotic and exoskeleton hands are provided. An exoskeleton hand can include a flexible actuator having a cavity and a reinforcement band. The cavity can be filled with a fluid from a pressure source, forcing the actuator to deform, bend or extend. The fluid that fills the cavity as a driving force can be a gas or liquid, which can be recyclable or disposable.

10 Claims, 24 Drawing Sheets

(52) U.S. Cl.
CPC ............... *A61H 2201/5069* (2013.01); *A61H 2201/5071* (2013.01); *A61H 2205/067* (2013.01); *A61H 2230/105* (2013.01); *A61H 2230/605* (2013.01)

(56) References Cited

U.S. PATENT DOCUMENTS

| | | | | |
|---|---|---|---|---|
| 4,733,603 | A * | 3/1988 | Kukolj | F15B 15/103 |
| | | | | 92/153 |
| 6,447,425 | B1 * | 9/2002 | Keller | A61B 5/1071 |
| | | | | 482/8 |
| 6,901,840 | B1 * | 6/2005 | Yatsko | F15B 15/103 |
| | | | | 91/1 |
| 8,574,178 | B2 | 11/2013 | Tong et al. | |
| 9,464,642 | B2 | 10/2016 | Ilievski et al. | |
| 9,506,455 | B2 * | 11/2016 | Mazzeo | B25J 9/1075 |
| 9,532,916 | B2 | 1/2017 | Tsui et al. | |
| 2003/0110938 | A1 * | 6/2003 | Seto | B25J 9/142 |
| | | | | 92/92 |
| 2008/0071208 | A1 | 3/2008 | Voegele et al. | |
| 2008/0167680 | A1 | 7/2008 | Voegele et al. | |
| 2008/0300692 | A1 * | 12/2008 | Moser | A61F 2/6607 |
| | | | | 623/55 |
| 2013/0253705 | A1 * | 9/2013 | Goldfarb | A61F 2/583 |
| | | | | 700/260 |
| 2015/0351936 | A1 | 12/2015 | Mosadegh et al. | |
| 2016/0252110 | A1 | 9/2016 | Galloway et al. | |
| 2017/0030381 | A9 | 2/2017 | Shepherd et al. | |
| 2017/0119614 | A1 * | 5/2017 | Yeow | A61H 1/0288 |
| 2018/0303698 | A1 | 10/2018 | Wijesundara et al. | |
| 2019/0374422 | A1 | 12/2019 | Yeow et al. | |

FOREIGN PATENT DOCUMENTS

| | | |
|---|---|---|
| CN | 103442667 A | 12/2013 |
| CN | 105619397 A | 6/2016 |
| CN | 106309083 A | 1/2017 |
| CN | 106456435 A | 2/2017 |
| JP | 2006-204612 A | 8/2006 |
| JP | 4564788 B2 | 10/2010 |

OTHER PUBLICATIONS

Office Action dated Oct. 20, 2020 in Chinese Application No. 201810330819.2.

Kamper, D.G. et al., "Relative Contributions of Neural Mechanisms Versus Muscle Mechanics in Promoting Finger Extension Deficits Following Stroke", Muscle & Nerve, Sep. 2003, 28:309-318, Wiley Periodicals, Inc.

Kamper, D.G. et al., "Weakness is the Primary Contributor to Finger Impairment in Chronic Stroke", Arch Phys Med Rehabil, Sep. 2006, 87:1262-1269, American Congress of Rehabilitation Medicine and the American Academy of Physical Medicine and Rehabilitation.

Towles, J.D. et al., "Lack of Hypertonia in Thumb Muscles After Stroke", J Neurophysiol, Oct. 2010, 104:2139-2146, The American Physiological Society.

* cited by examiner

FLEXIBLY DRIVEN ROBOTIC HANDS

BACKGROUND OF THE INVENTION

Robotic hands have a variety of applications in industry as well as the medical field. Robotic arms, hands and fingers of the prior art often incorporate the use of metal, beatings, cables, and pulleys. However, these devices can have issues associated with cost, complexity, speed of operation, dexterity, and safety. Therefore, there is still a need for robotic hand technologies that provide advantages in terms of power consumption, cost, manufacturing efficiency, power, speed, dexterity, safety and control.

BRIEF SUMMARY OF THE INVENTION

The present invention is directed toward apparatuses, systems, techniques, and methods for robotic movement. More specifically, the present invention can be applied to mechanical joints, joints of the extremities and limbs (including knee joints, elbow joints, the neck, ankle joints, and wrist joints) and robotic hands, including exoskeleton type robotic hands. Embodiments can include flexible exoskeleton robotic hands having flexible actuators with force compensating components. Flexible actuators of the present invention can include finger actuators, thumb joint actuators, thumb actuators, and finger spreading actuators. As a specific example, the present invention can be applied in the medical field to patients that have compromised hand movement.

A flexible actuator of the present invention can include a cavity or balloon with a reinforcement band for providing force compensation, defining a threshold activation force. A change in shape of the flexible actuator can be accomplished by the net force on the flexible actuator, wherein deformation takes place when the sum of force generated upon pressurization of the cavity and the external force is greater than the threshold activation force. The working principles of the present invention can be applied to various applications, e.g., a robotic hand.

A robotic hand or exoskeleton hand according to an embodiment of the present invention can include finger actuators that are flexible and have a cavity or balloon, a means for fluid communication with the cavity, and a pressure source for supplying a pressurized fluid to the cavity. Instead of supplying pressure, pressure can be released from the cavity or a vacuum can be applied to remove fluid from the cavity. Reinforcement bands can be provided on one surface of the finger actuator that restricts the expansion of the finger actuator on that surface. This can allow the opposing side of the actuator to expand relative to the bottom surface, creating a curling or grasping effect.

Reinforcement bands can be provided on the flexible actuators to compensate for joint torque in spastic flexed fingers using the threshold activation force of the flexible actuator. This can allow patients suffering from finger spasticity to extend their fingers, and therefore open their hand normally. Meanwhile, expansion of the flexible actuators on a surface can be restricted, causing the opposing side of the actuator to expand relative to the other surface upon finger joint torque compensation, creating a curling or grasping effect.

The finger actuator (i.e., a flexible actuator) can have multiple cavities that are separated widthwise, creating multiple sub-cavities, each spanning the length of the finger actuator. Furthermore, the finger actuator can also have multiple joint-cavities that are separated lengthwise, wherein multiple sub-cavities each contribute to the overall length of the finger actuator. By selectively pressuring specific cavities in each of the actuators, the actuators can be directed to move in different directions and bend at specific locations. Even when multiple sub-cavities are in fluid communication, the spacing between the cavities can promote bending at specific locations.

A structural mesh can be included within the actuators as a support as well as to control the bending or curling motion. The mesh can be impregnated within the actuators or fixed to the surface of the actuators. The pressure supplied to the cavities of the actuators can be regulated using a control valve, such as a solenoid valve. A microcontroller or microprocessor can be provided to control pressure to the cavities and regulate the overall movement of the exoskeleton hand. The microcontroller (or microprocessor) can have angle sensor signals, pressure sensor signals, solenoid valve signals, fluid source on-off signals, and valve position signals as inputs. Inputs to the microcontroller can also include signals from electromyography (EMG) or electroencephalography (EEG) sensors that allow a person to control the exoskeleton flexible hand.

The present invention can be applied in the medical field to assist those who have been disabled. As a specific example, the present invention can be applied in cases of finger spasticity, which is a serious problem for stroke patients. The present invention can assist stroke patients in recovering their hand function. That is, an exoskeleton hand according to the present invention can assist a stroke patient in opening and closing their hands and can be controlled by signals detected from the user's nerve or muscle signals. More complicated gestures such as pinching or lateral grasping can also be performed. After a series of training exercises, muscle strength of stroke patients can be improved and they may go on to perform normal hand functions without assistance.

DETAILED DISCLOSURE OF THE INVENTION

Embodiments of the present invention include apparatuses, systems, techniques, and methods for robotic hand movement. More specifically, embodiments of the present invention ("embodiments") can include robotic hands, including exoskeleton type robotic hands. Embodiments can include exoskeleton robotic hands having flexible actuators with force compensating components. Flexible actuators of the present invention can include finger actuators, thumb joint actuators, thumb actuators, and finger spreading actuators. The present invention can be applied, for example, in the medical field for patients that have compromised hand movement.

Figure 1:
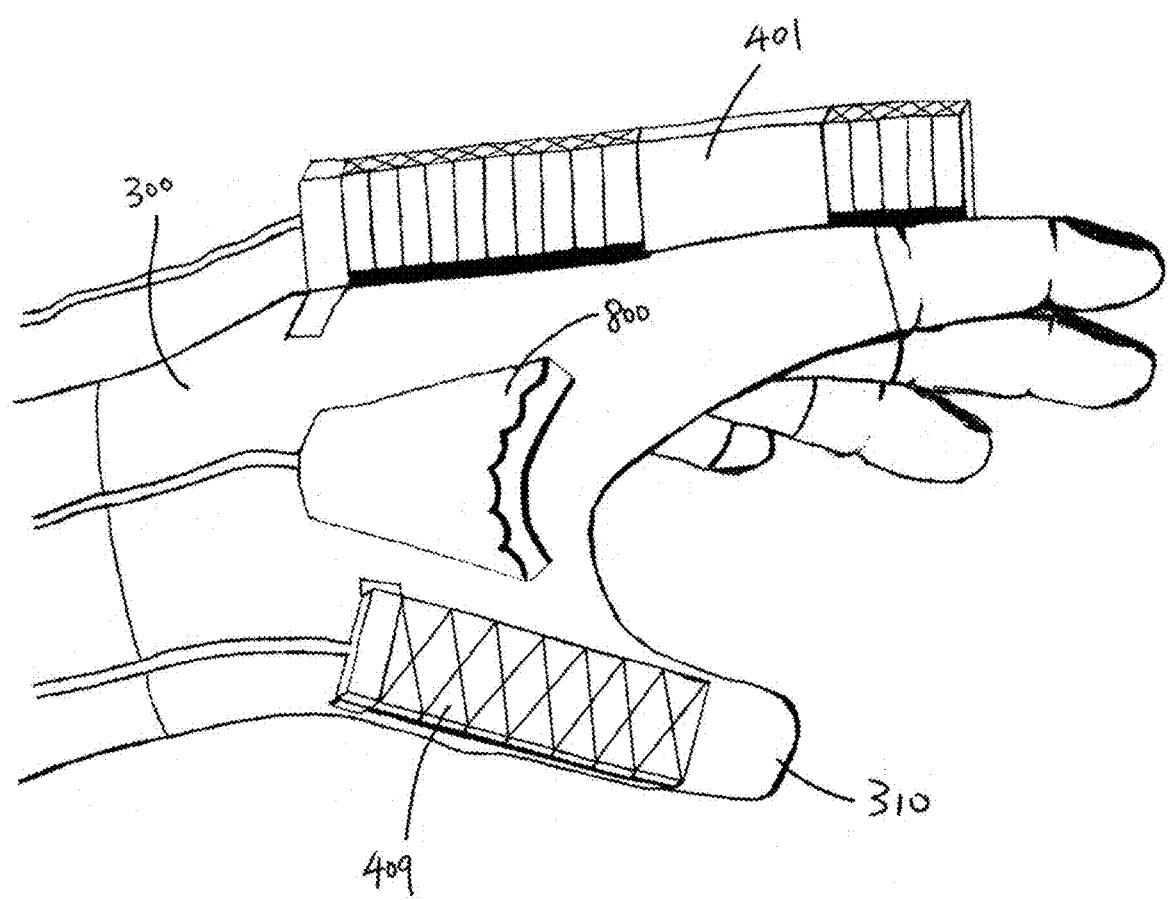
FIG. 1 shows an exoskeleton robotic hand (or flexible hand) according to an embodiment of the present invention.
Figure 2A:
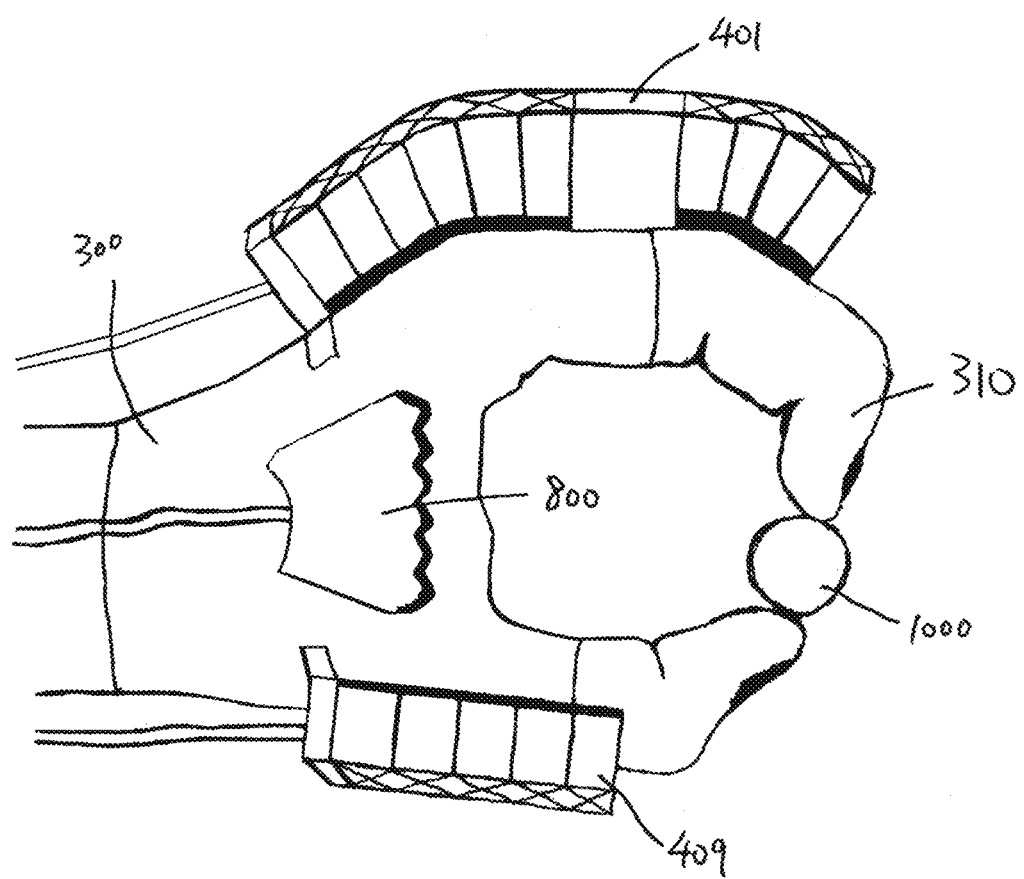
FIGS. 2(a) and (b) depicts different pinching tasks accomplished using an embodiment of the present invention.

FIG. 1 shows an exoskeleton robotic hand (or an exoskeleton flexible hand) according to an embodiment of the present invention. A robotic hand or exoskeleton hand 300 according to and embodiment can include a finger actuator 401 that is flexible and having a cavity or balloon 411, a means for fluid communication with the cavity 405, and a pressure source for supplying a pressurized fluid to the cavity. In addition to supplying pressure, pressure can be released from the cavity or a vacuum can be applied to remove fluid. Reinforcement bands 412 on the bottom surface of the finger actuator 401 can be provided that restrict the expansion of the finger actuator on its bottom surface. This can allow the top of the actuator to expand relative to the bottom surface, creating a curling or grasping motion, as seen in FIG. 2(a).

The finger actuator 401 can have two, or three, or four, or five (or multiple) cavities that are separated widthwise, creating multiple sub-cavities each spanning the length of the finger actuator. An example of this concept can be seen in FIG. 4, which shows an embodiment having multiple sub-cavities 104, 105, 106 each spanning the length of the finger actuator. Each of the sub-cavities can have its own pressure source such that a top sub-cavity 105 can be pressurized and expand relative to one or more bottom cavities 104, 106, causing the finger actuator to curl or grasp as shown by 124.

Figure 7A:
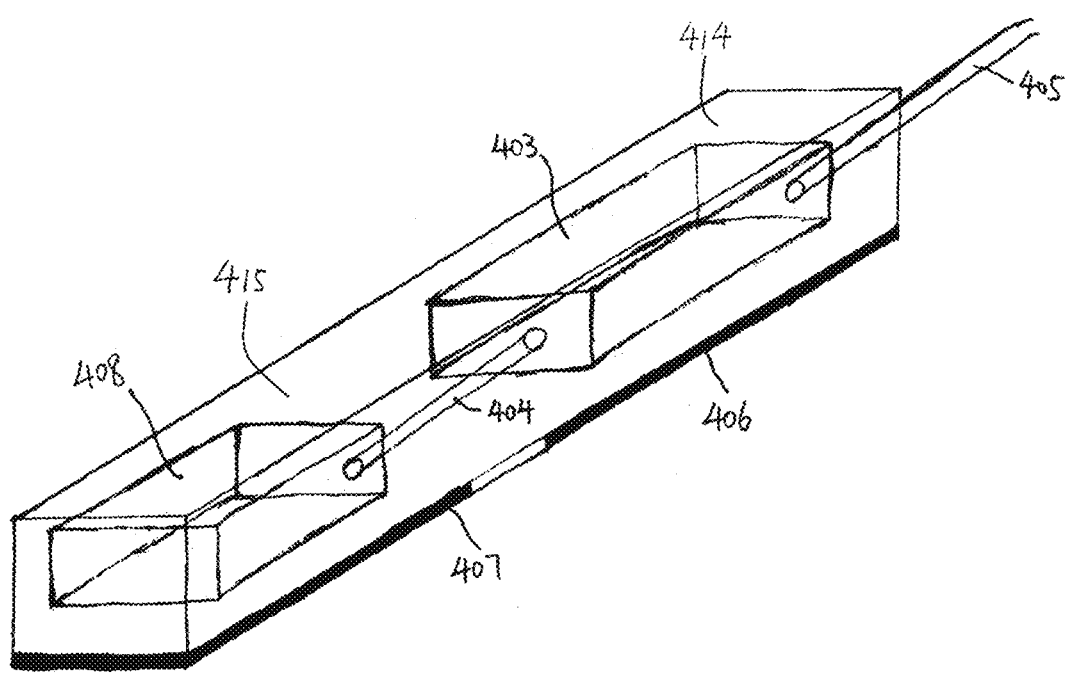
FIGS. 7(a) and (b) show finger actuators (or flexible actuators) of an exoskeleton robotic hand according to some embodiments.

The finger actuator 401 can also have two or three (or multiple) joint-cavities 408, 403 that are separated lengthwise (having multiple sub-cavities each contributing to the overall length of the finger actuator) and joints in between, as shown in FIG. 7(a). The joint-cavities 408, 403 can be in fluid communication using independent tubing or through passages 404 in the finger actuator, or can each have independent sources of pressure. The joint-cavities can correspond to each of the metacarpophalangeal joint (MCP)—the joint at the base of the finger, the proximal interphalangeal joint (PIP)—the joint in the middle of the finger, and the distal interphalangeal joint (MP) of each of the index finger, middle finger, ring finger, and small finger (or pinky) of the human hand. For the thumb, the joint-cavities can correspond to each of the Carpometacarpal (CMC) Joint, Metacarpophalangeal (MP) Joint, and Interphalangeal (IP) Joint.

Figure 7B:
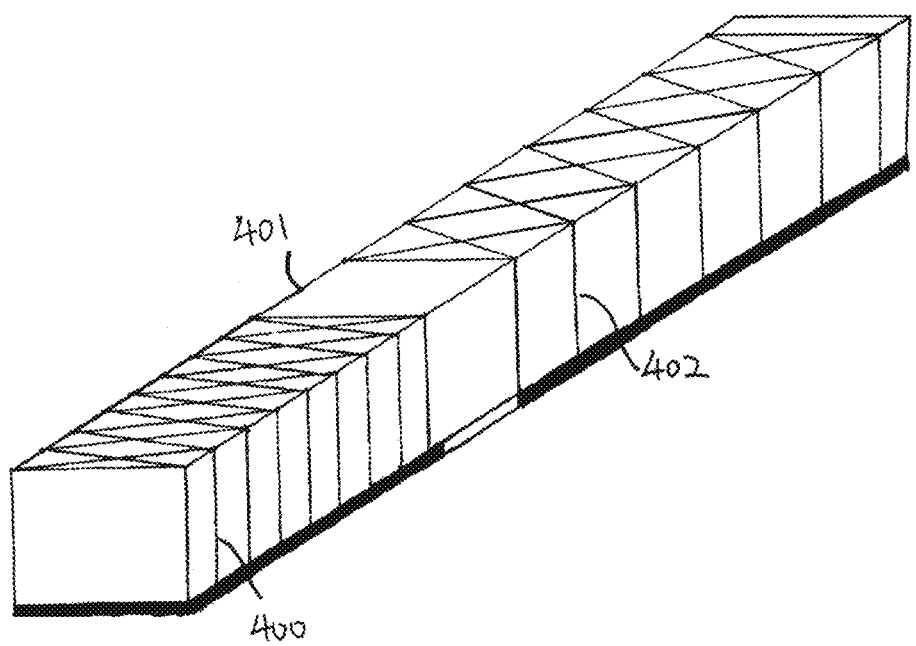

The cross-section of the actuators can be spherical, hemispherical, rectangular, square, or a polygon. A structural mesh 400, 402 can be included within the finger actuators, as demonstrated in FIG. 7(b). The structural mesh can be formed using lengthwise filaments, widthwise filaments, or a patterned mesh. Examples of a patterned mesh that can be applied include a net mesh or a double helical mesh. The mesh can be impregnated within the actuators or fixed to the surface of the actuators. A finger actuator can be provided for each of the thumb, index finger, middle finger, ring finger, and pinky finger. This means that each of the finger actuators can have a different size and joint configuration, depending on which finger the finger actuator is applied. The human thumb has different movement characteristics than the fingers and therefore the design of the thumb actuator can be adjusted to reflect these differences. Finger spreading actuators 820 can also be included between any two fingers 603. The finger spreading actuators 820 can be placed between any two fingers and, when pressurized, can cause the fingers to spread. The design of the finger spreading actuators 820 can be similar to the thumb joint actuator 800 of FIG. 2(a); however, it may only require one planar cavity, as the fingers do not have the ability to oppose each other. Alternatively, finger spreading actuators 820 can have one pressure source for two cavities 806, 807.

Figure 12A:
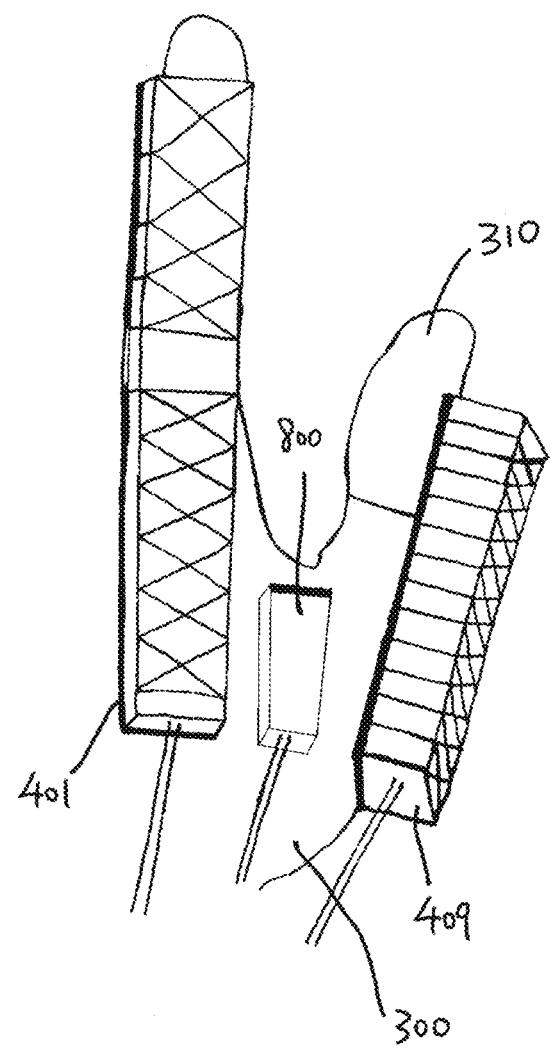
FIGS. 12(a) and (b) illustrate the position of a thumb joint actuator in accordance with some embodiments.
Figure 12B:
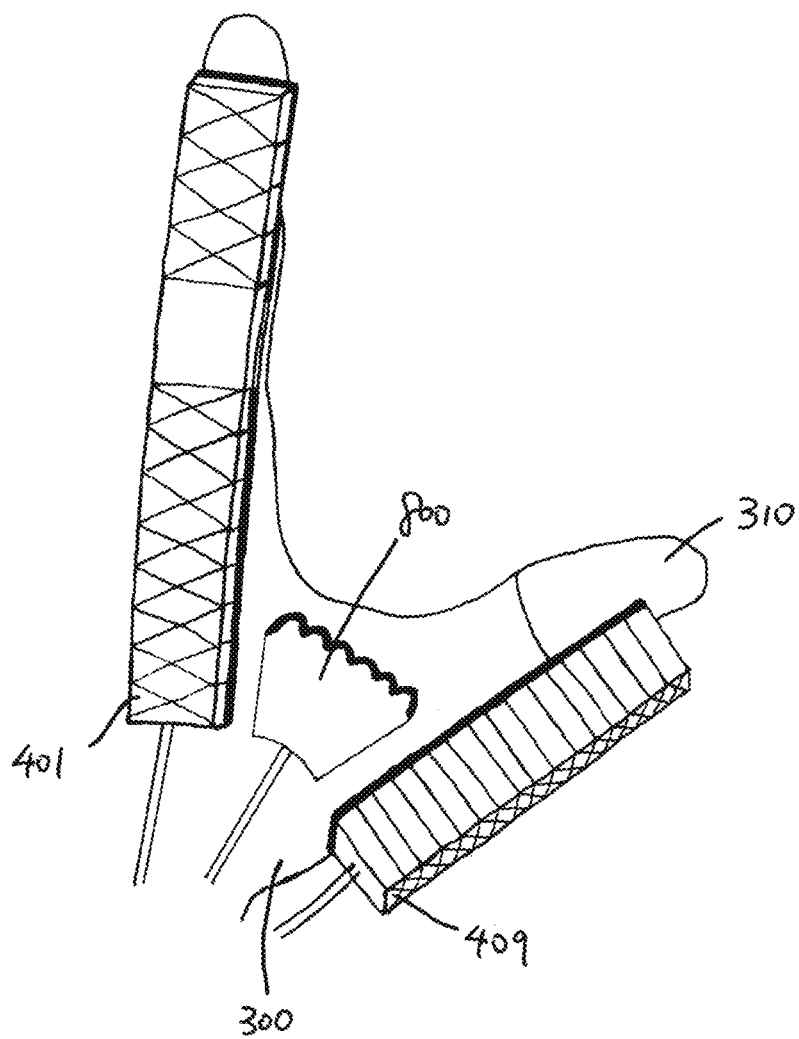
Figure 13:
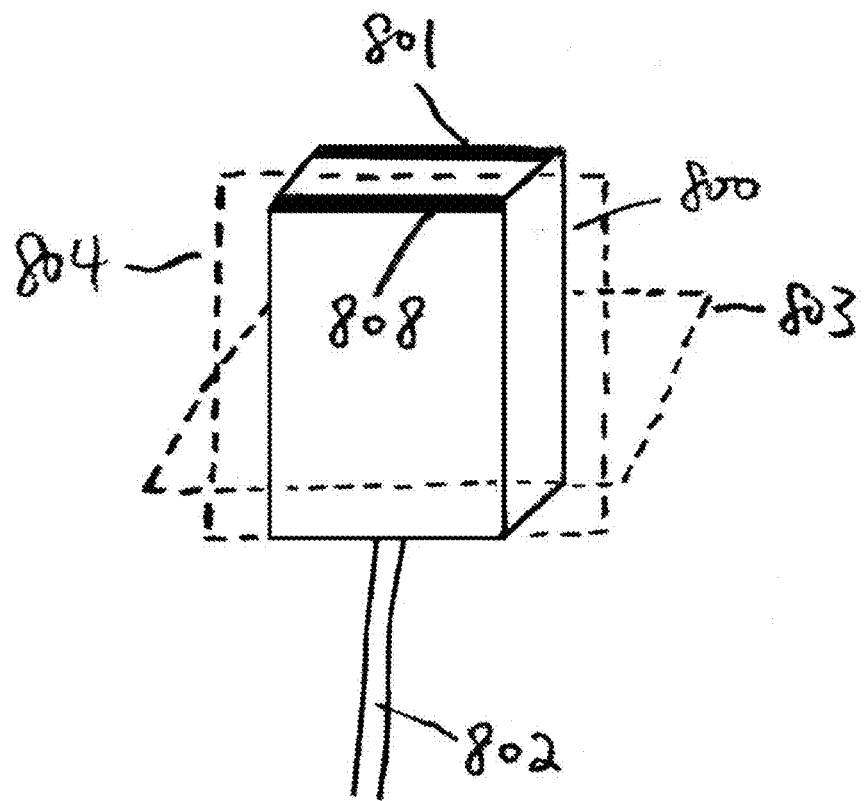
FIG. 13 illustrates a thumb joint actuator of an exoskeleton robotic hand in accordance with some embodiments.
Figure 13:
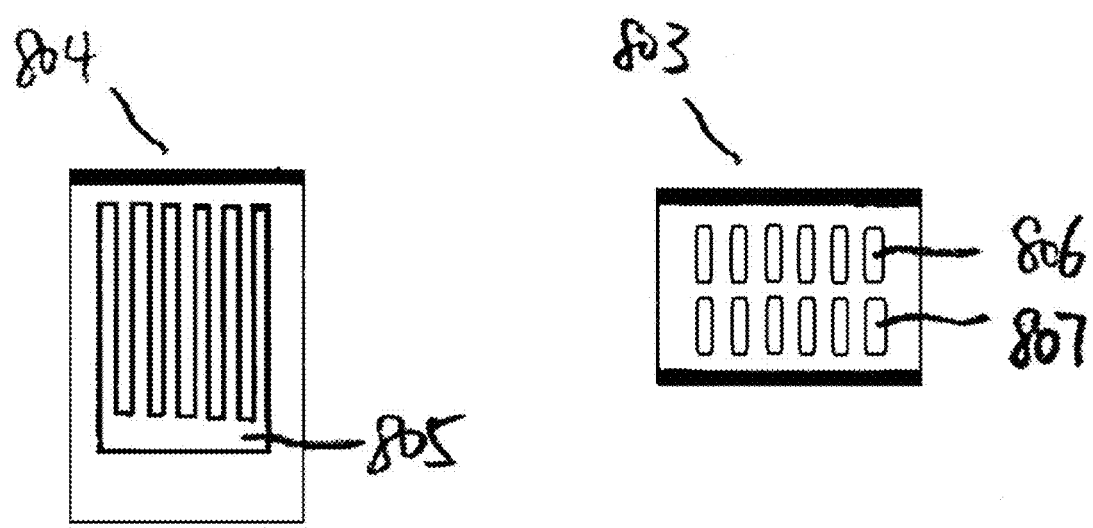

FIGS. 12 and 13 illustrate thumb joint actuators of the present invention. A thumb joint actuator 800 can be provided to separate the thumb and index finger and turn the thumb to oppose the fingers. The thumb joint actuator 800 can also include reinforcement bands on its bottom (or top) to restrict its movement and promote a curling effect in which the thumb spreads apart from and turns to face the remaining fingers. The thumb joint actuator 800 can include multiple cavities including a top layer cavity 806 (or cavities) and a bottom layer cavity 807 (or cavities). The bottom and top cavities 806, 807 can be in fluid communication such that one pressure source can expand the thumb joint actuator and separate the thumb and index finger. In an alternative embodiment, the top and bottom cavities can have separate pressure sources such that the top expands relative to the bottom and causes the thumb to turn and oppose the remaining fingers. The top and bottom cavity each can have a stacked and comb-like structure, as shown in FIG. 13.

The finger actuators, the thumb actuator, the thumb joint actuator, and the finger spreading actuators 820 can be secured to a glove, and the glove can be worn on one's hand. Alternatively, the finger actuators (or any of the actuators) can include an adhesive on their bottom surface. The adhesive can be secured on a hand or a grasping structure, such as the frame of a robotic hand.

Figure 11A:
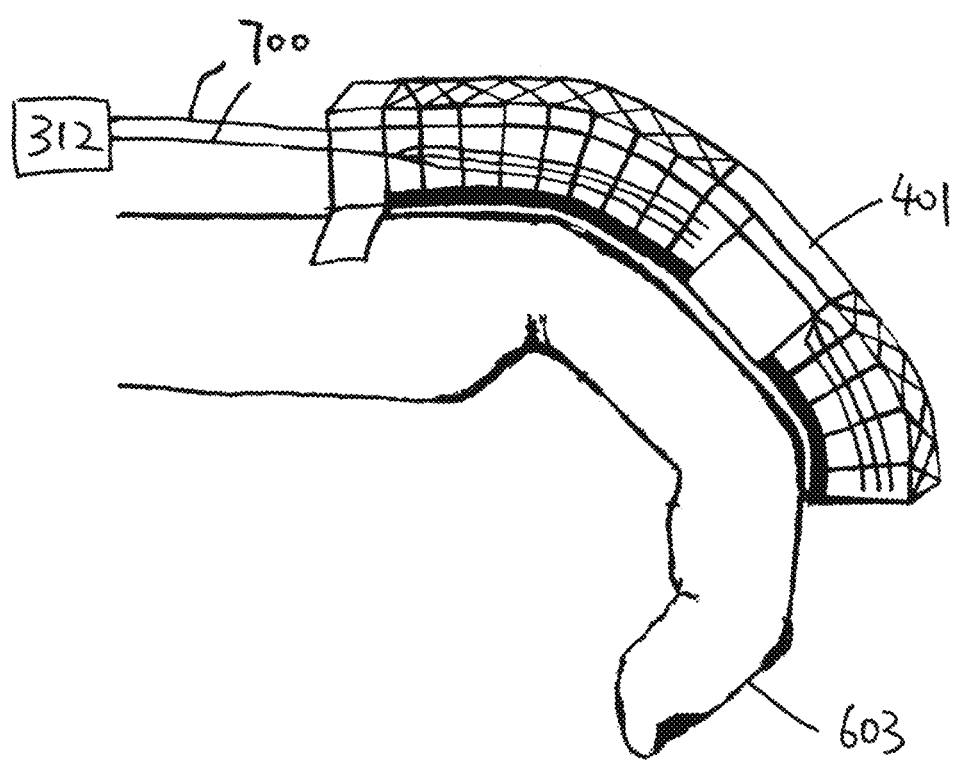
FIGS. 11(a) and (b) illustrate finger actuators with bending angles utilized as a control feedback mechanism in accordance with some embodiments.
Figure 11B:
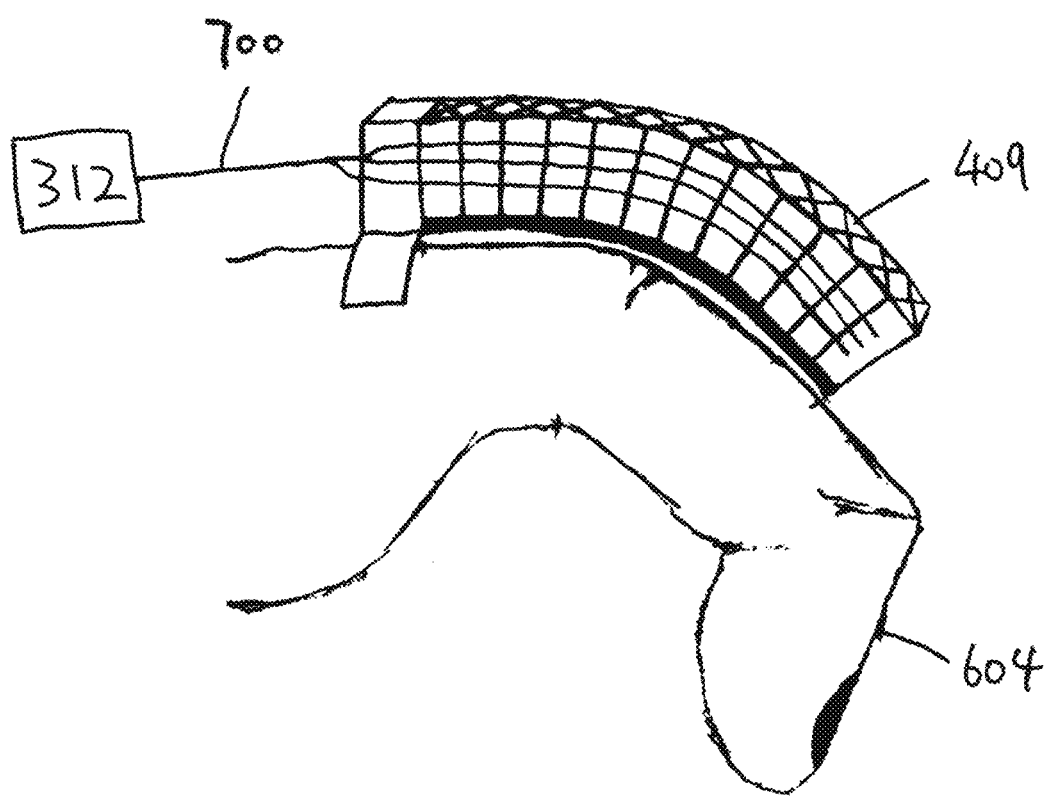

The cavities of the actuators can be supplied with pressure using a tube. The tube can also be used to create a vacuum to remove fluid from and collapse the cavities within the actuators. Angle measuring sensors can be provided at one or more places on the actuators (e.g., at the MCP, PIP, CMC, MP, IP and DIP joints) to measure the angle of each joint. In another example as shown in FIG. 11(a), a full length flexible angle sensor 700 can be provided that spans the length of a finger actuator. Furthermore, angle sensors can be provided in the thumb joint actuator 800 and the finger spreading actuators 820 to measure the opposition angle of the thumb relative to the remaining fingers as well as the angle between fingers.

Figure 3:
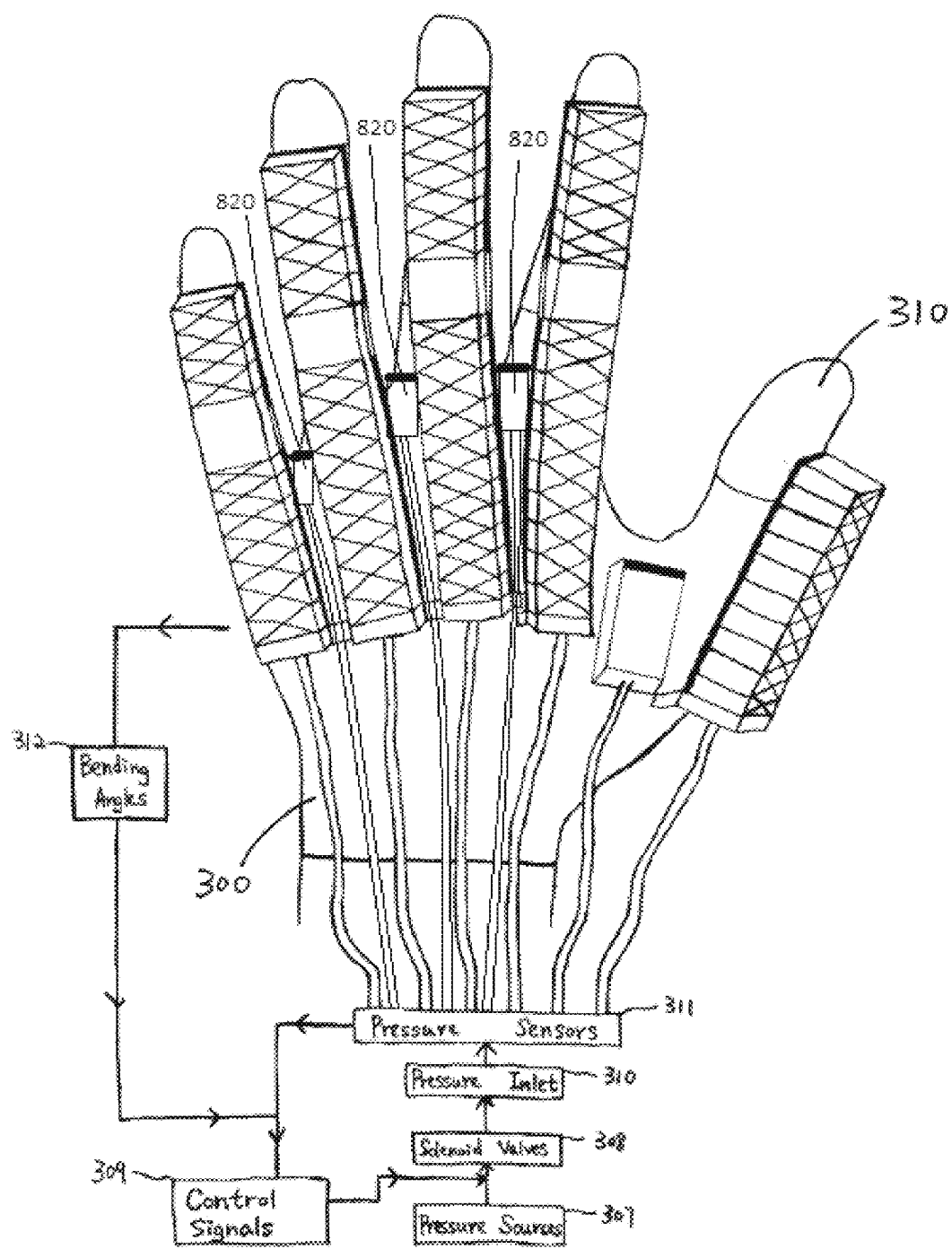
FIG. 3 depicts an exoskeleton robotic hand (or flexible hand) and related control mechanisms in accordance with an embodiment of the present invention.

FIG. 3 illustrates an example of a control mechanism that can be used to operate an exoskeleton robotic hand of the present invention. The pressure supplied to the cavities of the actuators can be regulated using a control valve, such as a solenoid valve 308. A microcontroller or microprocessor can be provided that controls pressure to the cavities. The microcontroller (or microprocessor) can have angle sensor signals 312, pressure signals 311 from pressure sensors, solenoid valve signals, fluid source on-off signals, and valve position signals as inputs. Inputs to the microcontroller can also include signals from electromyography (EMG) or electroencephalography (EEG) sensors that allow a person to control the exoskeleton flexible hand.

The exoskeleton flexible hand can be designed with certain objectives in mind. For example, the actuators can be designed to exhibit a straightening force if applied to a spastic hand of a person who has had a stroke. Therefore, when the cavities of the actuators are at ambient pressure, the actuator will apply a straightening force to the hand. This can be accomplished by including elastic filaments within the actuator (not shown) or by purposeful material selection and design. Furthermore, this can be accomplished by the force compensation providing a threshold activation force to the actuators by the reinforcement bands, while the process includes purposeful material selection and design.

The fluid provided to the cavities of the actuators can be a gas or a liquid, and can be recycled or disposable. For example, a compressed gas can be applied by way of a cylinder or compressor. The pressure source can include a pressure regulator prior to the control valve to maintain consistent performance. Specific examples of gasses that can be applied include carbon dioxide, air, and nitrogen. When the cavities are depressurized, these gasses can vent to the atmosphere or be recycled. The gas can also be drawn out of the cavities creating a vacuum using, for example, a plunger or positive displacement pump. Examples of liquids that can be supplied to the actuators include water, hydraulic fluid, and mineral oil.

Pressurizing the actuators and taking joint angle measurements can occur simultaneously and be regulated using a microcontroller (and/or a microprocessor). The microcontroller can be programmed to determine when increasing pressure no longer results in a change in joint angle measurements and the increase in pressurization can be stopped and the pressure maintained. This feature can allow for grasping of object. The microcontroller can be further programmed to determine grasping strength by specifying the amount of pressure injected to the cavities.

Figure 2B:
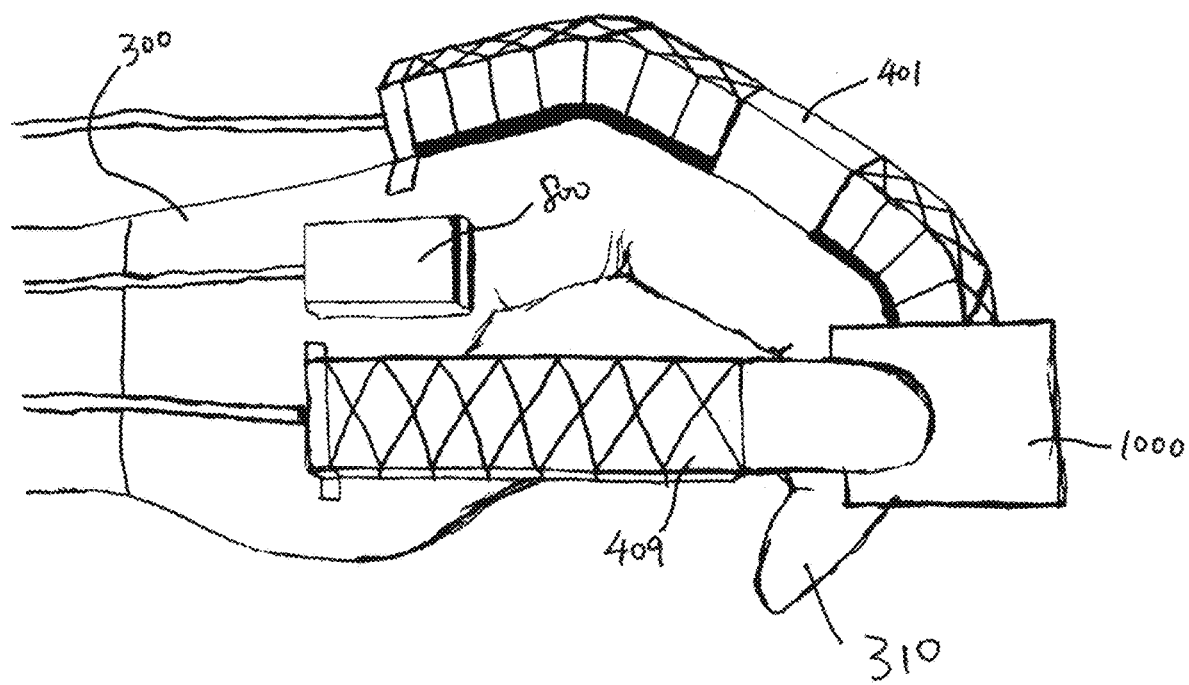

FIGS. 1, 2(a), and 2(b) show an exoskeleton flexible hand 300 according to an embodiment of the present invention. The exoskeleton flexible hand 300 is shown applied to a human hand 310, while FIGS. 2(a) and 2(b) show objects 1000 being held by fingers. The exoskeleton flexible hand 300 can include a wearable glove having a thumb actuator 409, four finger actuators 401 for the index finger, middle finger, ring finger and small finger (or pinky finger), and a thumb joint actuator 800. The finger actuators, thumb joint actuator, thumb actuator, and finger spreading actuator 401, 800, 409, 820 can be made of flexible materials such as, for example, rubber or silicone. FIG. 3 also shows a control mechanism including pressure sensors, solenoid valves, control signals, a pressure inlet, pressure sensors, and angle sensors and angle signals 307-312 that can be used to drive the exoskeleton flexible hand 300.

The flexible actuators of the present invention can include an embedded elastomer balloon (or cavity) with a reinforcement band. The flexible actuators can have a single cavity or multiple cavities, and certain embodiments can include supporting filaments. The supporting filaments can form a structural mesh. Working principles of a flexible actuator according to the present invention can be seen in FIGS. 4, 5 and 6, in which an elastomer balloon 100 is fixed at point 102 and divided into three chambers 104, 105, 106, and embedded with a double helical mesh support 101 and a reinforcement band 103. To implement force compensation, a threshold activation force $F_{th}$, defined by the maximum force that the reinforcement bands can provide without distortion, is applied to the flexible actuator to compensate for the external forces that would otherwise alter the shape of the elastomer balloon 100.

Figure 4:
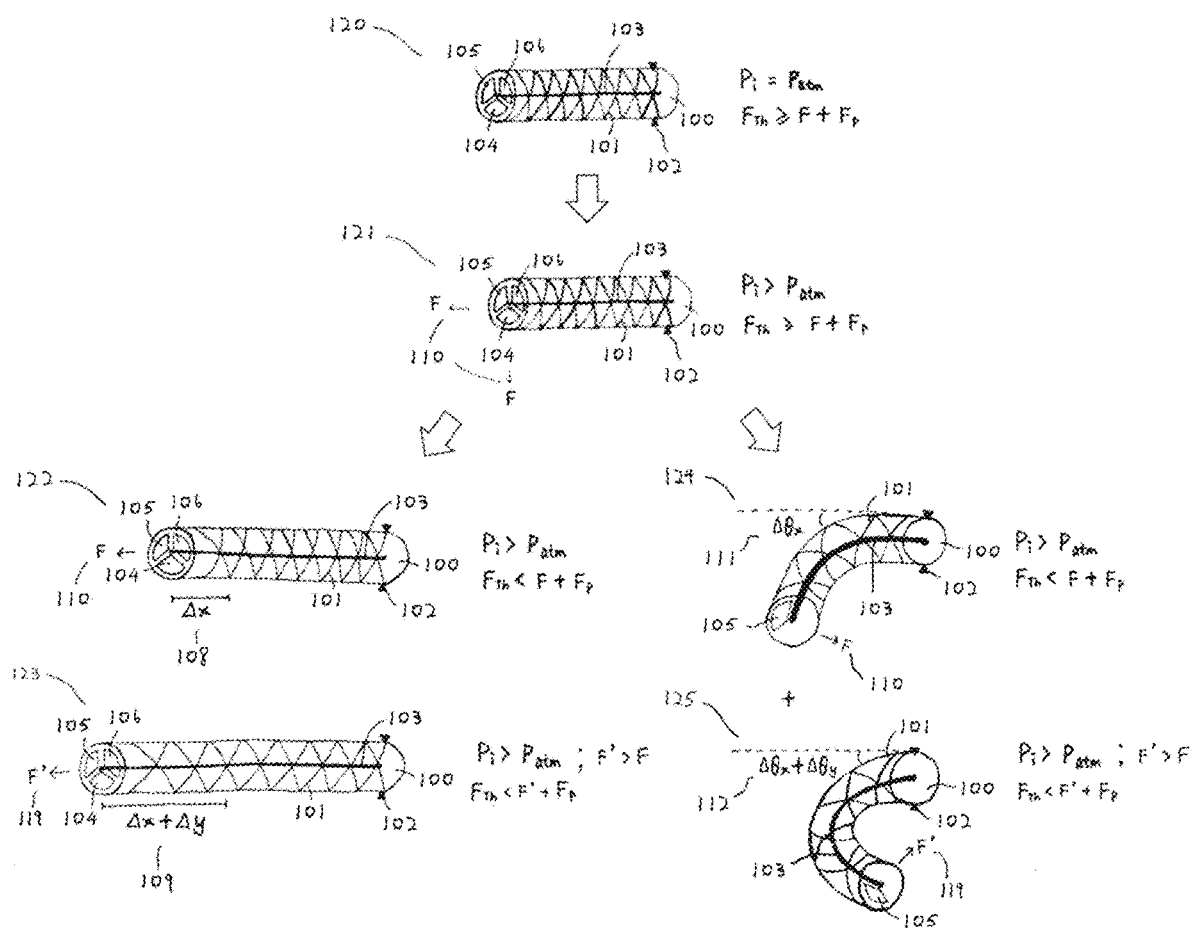
FIG. 4 is a schematic diagram illustrating the functioning of flexible actuators of the present invention.

The pre-deformed initial position (or shape) 120 of an unpressurized elastomer balloon 100 is shown in FIG. 4 (i.e., $P_i = P_{atm}$, F=0, $F_p=0$). Upon an increase of external force F and pressurization force $F_p$ generated by the elastomer balloon 100 upon fluid injection (i.e. $P_i > P_{atm}$) of any chamber at 121, there is no motion in the elastomer balloon 100 as the threshold activation force is greater than the sum of the external force 110 and the pressurization force $F_p$ (i.e. $F_{th} \geq F + F_p$). Further pressurization can lead to an increase of pressurization force 100, which becomes greater than the threshold force, in addition to the external force 110 (i.e. $F_{th} < F + F_p$), causing linear extension 108 (i.e. $\Delta x$) upon pressurization of all chambers 104, 105, 106 as shown at 122. If one or more chambers have greater pressure than the others, curling can occur (111, i.e. $\Delta \theta_x$). Upon pressurization of chamber 105, as shown at 124, the actuator can bend in the x-direction. To further increase the external force 119 to F', as shown at 123 and 125, the shape of the elastomer balloon 100 can be altered to create extra displacement (i.e. $\Delta y$ and $\Delta \theta_y$), to increase the linear extension 109 (i.e., $\Delta x + \Delta y$), and to increase the linear bending motion 112 (i.e. $\Delta \theta_x + \Delta \theta_y$), of the elastomer balloon 100, respectively.

Herein, $P_i$ represents the pressure in the pressurizing chambers 104, 105, 106, $P_{atm}$ represents the atmospheric pressure, $F_{th}$ represents the threshold activation force, and F and F represent the external forces 110, 119, wherein F'>F, $F_p$ represents the force generated by the elastomer balloon 100 upon pressurization (i.e. $P_i > P_{atm}$) of at least one chamber 104, 105, 106, $\Delta x$ represents the extension created by F and $F_p$, $\Delta y$ represents the increase of extension by the increased external force to F', $\Delta \theta_x$ represents the bending motion created by F and $F_p$, and $\Delta \theta_y$ is the increase in bending motion caused by the increased external force to F'.

Figure 5:
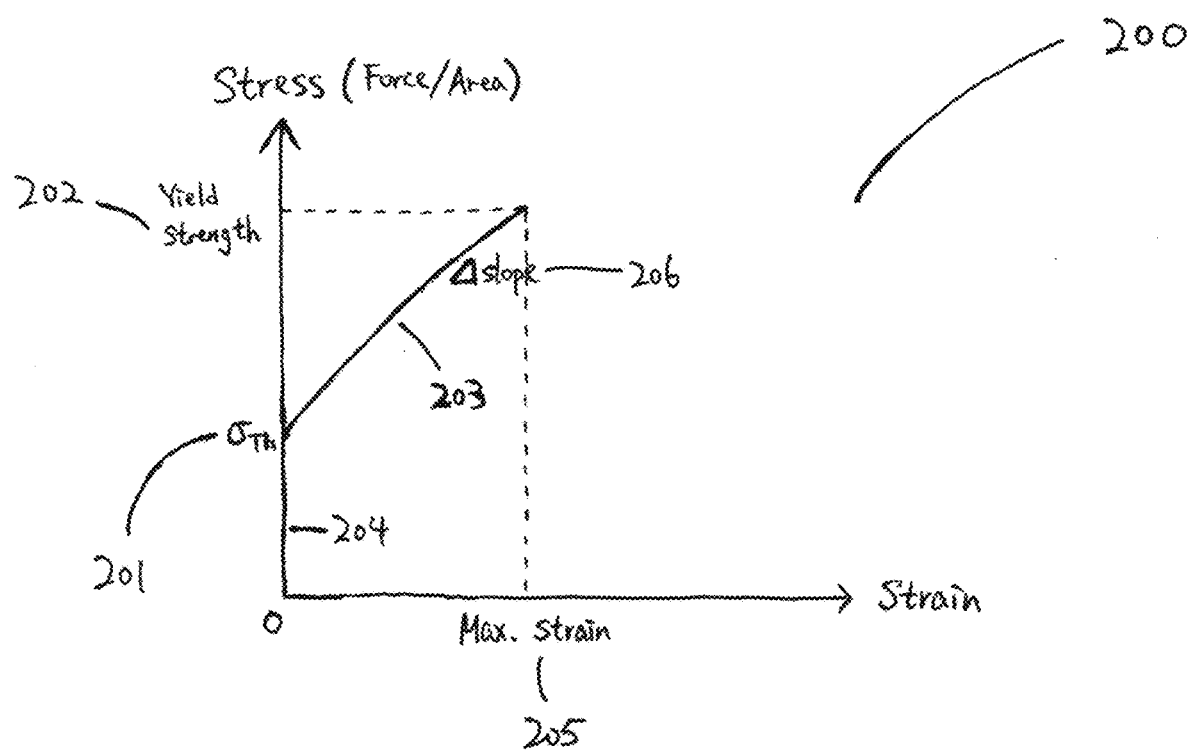
FIG. 5 is a graph illustrating the stress-strain relationship of a flexible actuator according to the present invention.

Choice of materials for the reinforcement bands can include elastic or inelastic materials (including metal, rubber, nylon, plastics, polyester, and silicon) with a durometer greater than the elastomer balloon 100, or the remaining part of the actuators. Upon force compensation of the reinforcement band, the stress-strain characteristics of the elastomer balloon 100 is converted from the traditional hyper-elastic model to a new linear stress-strain relationship 200, as shown in FIG. 5. To trigger deformation of the elastomer balloon 100, a threshold activation stress 201 (i.e. $\sigma_{Th}$) on the stress-strain curve 203 is provided by the reinforcement bands to compensate for external forces on the elastomer balloon 100. Over the threshold activation stress 201 (i.e. $\sigma_{Th}$), the new linear stress-strain relationship 200 can be defined by the slope 206 of the stress-strain curve 203, which is the Young's modulus of the reinforcement bands. Upon pressurization, the elastomer balloon 100 deforms the reinforcement band in the same direction, only elastically, meaning stress developed on the force compensating reinforcing band is always under the Yield strength 202, and at the same time the motion of the elastomer balloon 100 is restricted by the maximum strain 205 that can exist on the force compensating reinforcing band. Herein, $\sigma_{Th} = F_{th}/A$, where A is the area of the pressurizing chambers.

Figure 6:
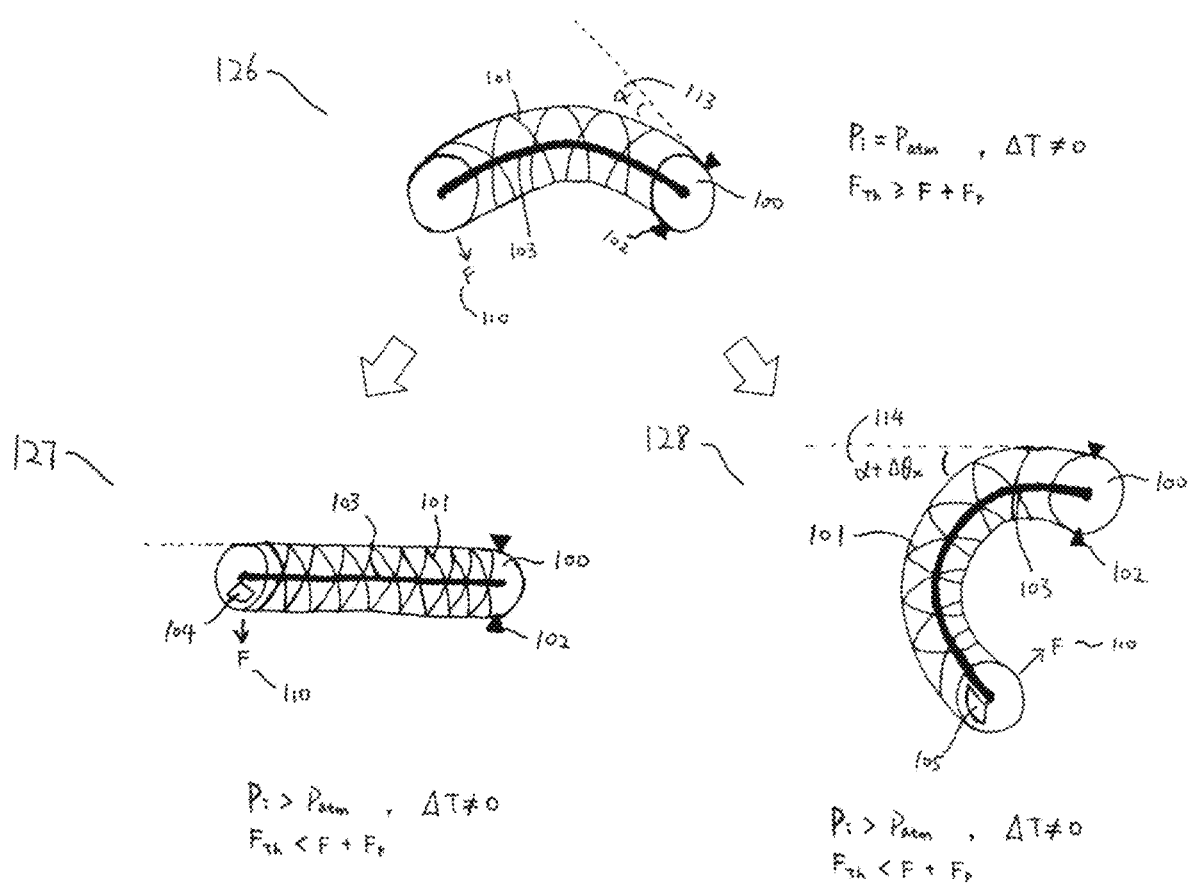
FIG. 6 illustrates the shape memory effect of the reinforcement bands of the present invention including the effect of temperature variations.

The principle of shifting the pre-deformed initial shape of the flexible actuator is depicted in FIG. 6, in which the reinforcement band 103 can change its shape or stress-strain relationship by changing its temperature. At 126, upon temperature variations (i.e. ΔT..0), the pre-deformed initial position of the unpressurized elastomer balloon 100 (i.e. $P_i=P_{atm}$, F=0, $F_p=0$) is shifted with a position difference 113 (i.e. α) compared with the elastomer balloon 100 at 120. Given the new pre-deformed initial position (shape) at 126, as soon as the sum of the forces is greater than the threshold activation force (i.e., $F_{th}<F+F_p$), the elastomer balloon 100 can extend back to the position shown in 127. This is similar to 124 in FIG. 4 upon pressurization of chamber 104, or otherwise an increased bending angle 114 can be created including an angle difference 113 (i.e. α) at 128 upon pressurization of chamber 105. Herein, ΔT represents the temperature variations, and α represents the position difference due to the change of the pre-deformed initial position.

The finger actuators 401, 409 follow can operate using the principles of the flexible actuators. FIGS. 7(a) and (b) illustrate a finger actuator 401 that is made of two flexible actuators, with the elastomer balloon 414 including one pressurizing chamber 403 and the elastomer balloon 415 including another pressurizing chamber 408, which are connected to each other by a tube or channel 404 in the actuator. Two separated reinforcement bands 406, 407 are placed at the bottom of each two elastomer balloons 414, 415. At least one pressure inlet 405 is provided for the finger actuator 401. Two double helical structural mesh supports 402, 400 can also be embedded in each elastomer balloon 414, 415. The finger actuator 401 can be configured in a segmented fashion, which can be specifically designed for fingers of a hand 310.

Figure 8A:
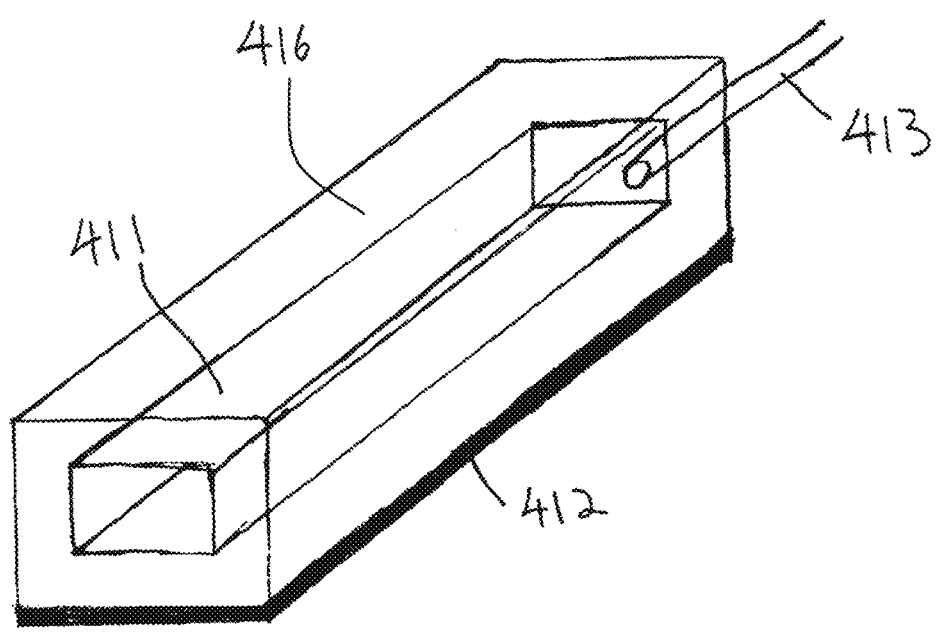
FIGS. 8(a) and (b) depicts a thumb actuator of an exoskeleton hand in accordance with some embodiments.
Figure 8B:
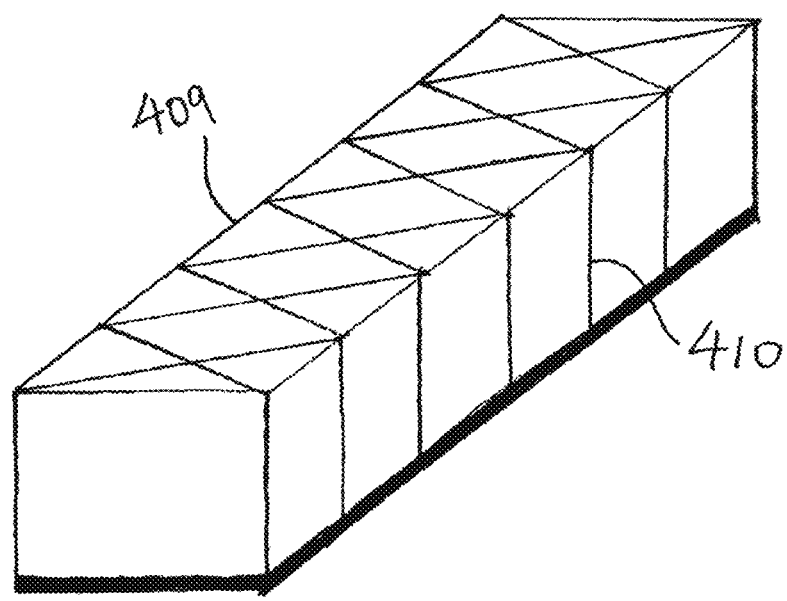

In FIGS. 8(a) and (b), the thumb actuator 409 includes a flexible actuator. The elastomer balloon 416 includes one pressurizing chamber 411 that is embedded with a double helical mesh structural support 410. A reinforcement band 412 can be placed at the bottom of the elastomer balloon 416. At least one pressure inlet 413 can be provided for the pressure inlet of the finger actuator 409. The thumb actuator 409 can bend and is designed for the thumb of the hand 310.

Figure 9:
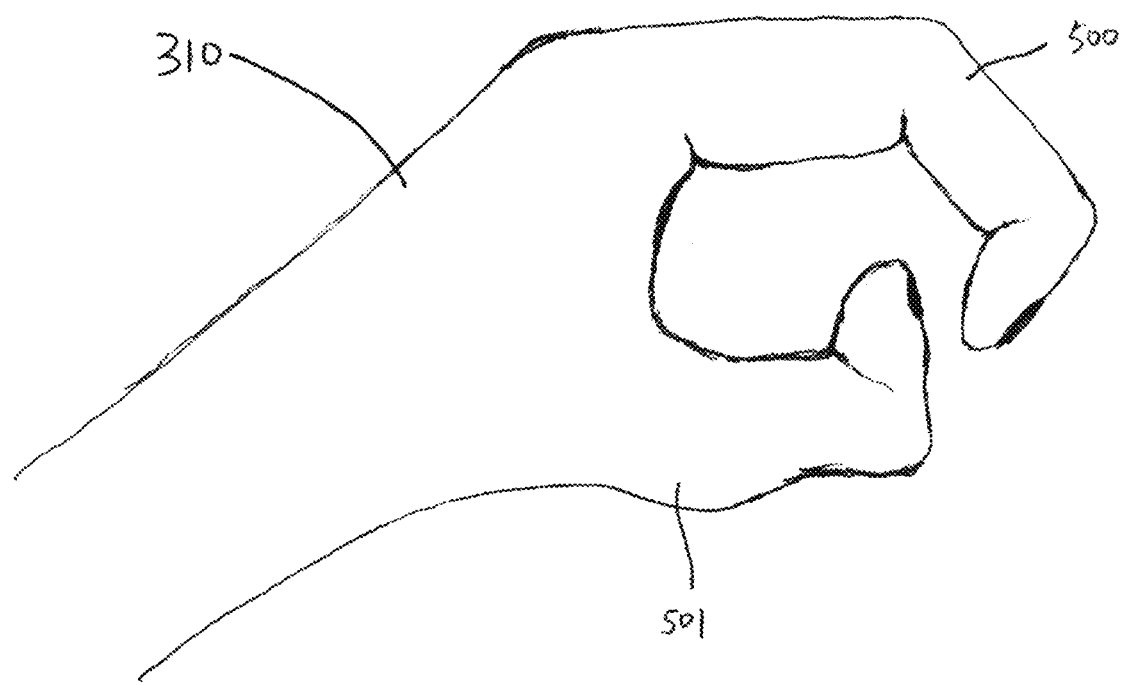
FIG. 9 depicts an example of a compromised or spastic hand (e.g., as may occur in patients that have had a stroke).
Figure 10A:
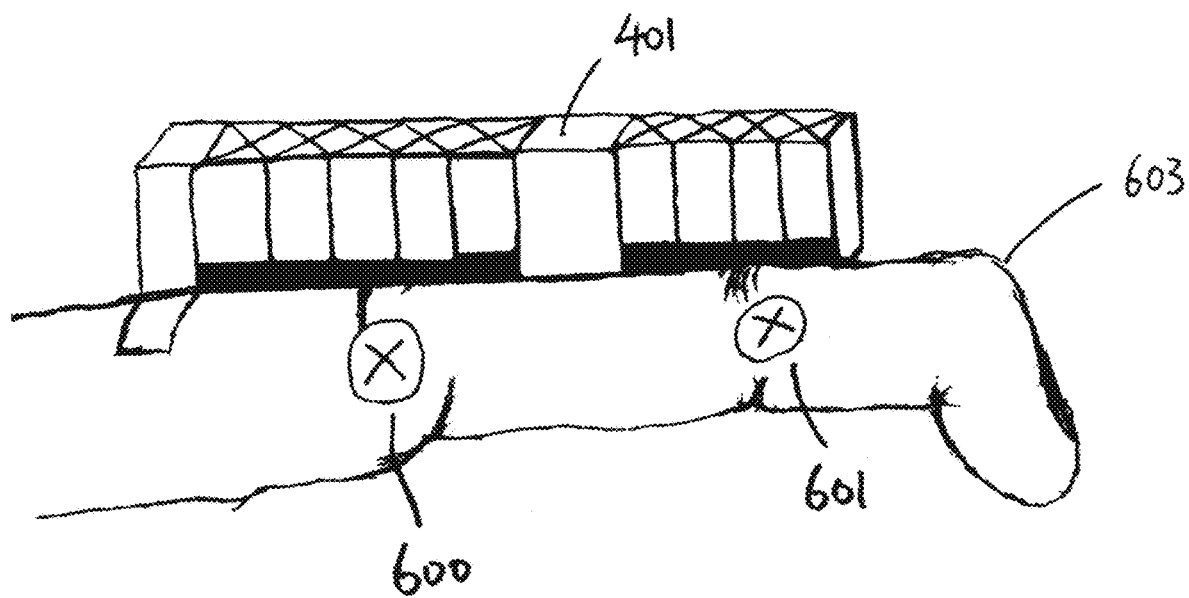
FIGS. 10(a) and (b) depict the positioning of finger actuators in accordance with some embodiments.
Figure 10B:
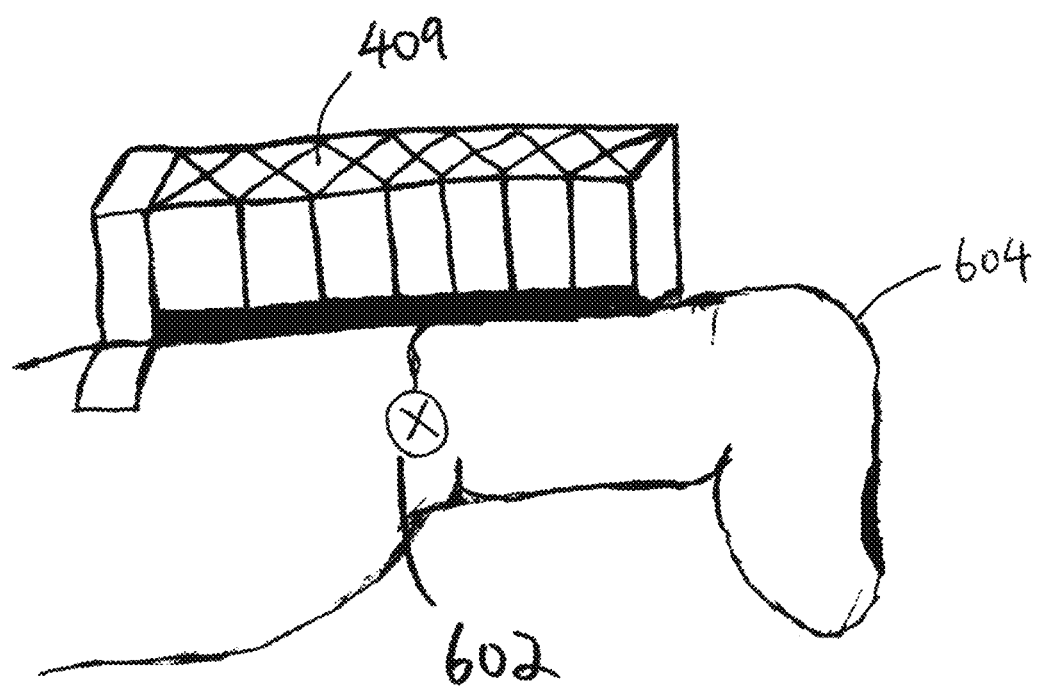

A spastic hand of stroke patients is shown in FIG. 9, and the characteristics of a spastic hand can be found on the flexed spastic thumb 501 and finger 500. Stroke patients suffering from finger spasticity often have difficulty opening their hand, meaning they cannot extend their fingers by themselves. In physical terms, there is a torque on the finger joints (e.g. the MCP joints, the PIP joints, etc.) flexing the fingers at all times. FIGS. 10(a) and (b) depict the position of a finger actuator 401 compensating for the torque at the MCP joint 600 and PIP joint 601 on fingers 603 other than the thumb, and the position of the thumb actuator 409 compensating for the torque in the MCP joint 602. Therefore, the finger actuators 401, 409 on the exoskeleton flexible hand 300 can compensate for the torque in the finger joints, and therefore drive the bending motion as shown in FIGS. 11(a) and (b). FIG. 3 also shows bending angle output signals 312 from by the flexible angle sensors 700 that are input to the control schematics 307-312.

The force compensation of finger joint torque is determined by defining an optimal value of the threshold activation force $F_{th}$ of the reinforcement band 406, 407, 412. In more detail, the threshold activation force $F_{th}$ is defined by the balance between the flexural rigidity (EI) of the reinforcement band 406, 407, 412 and the amount of finger joint torque. The dimensions of reinforcement band can be obtained by the moment of inertia and material selection that leads the flexural rigidity to be equal to the finger joint torque. This equalization defines the threshold activation force of the reinforcement band 406, 407, 412 as the calculated flexural rigidity (i.e. $F_{th}$=EI=F), while the external force F equals the calculated flexural rigidity, or the finger joints torque as they are in equal relation. Upon pressurizing the finger actuators 401, 409, any $P_i$ larger than $P_{arm}$ is enough to create the force for achieving a bending motion. In mathematical terms, the pressurization force $F_p$ generated upon pressurization of any pressure inlet $P_i>P_{atm}$ can lead to $F_{th}<F+F_p$, as $F_{th}$=F. Furthermore, the calculated flexural rigidity also defines the threshold activation stress (i.e. $\sigma_{Th}$) by dividing the calculated flexural rigidity to the area of pressurizing chamber(i.e. $\sigma_{Th}$=EI/A).

To increase the degree-of-freedom of the exoskeleton flexible hand 300, FIG. 12(a) shows the thumb joint actuator 800 placed around the thumb joint to facilitate complex movement (e.g. abduction, flexion, opposition, etc.), and an example of extension movement is depicted in FIG. 12(b). FIG. 13 depicts a thumb joint actuator 800 having a plurality of connected pressurizing chambers 805, as shown at 804, and separating the plurality of connected pressurizing chambers 805 into two layers 806, 807 from plane 804, as shown at 803. At least one pressure inlet 802 can be provided for the pressure inlet of the thumb joint actuator 800. Two reinforcement bands 801, 808 can extend along the longitudinal direction of the top edges of the thumb joint actuator 800, reinforcing the thumb joint actuator and allowing it to return to the pre-deformed initial position (or shape) in an unpressurized state.

Figure 14A:
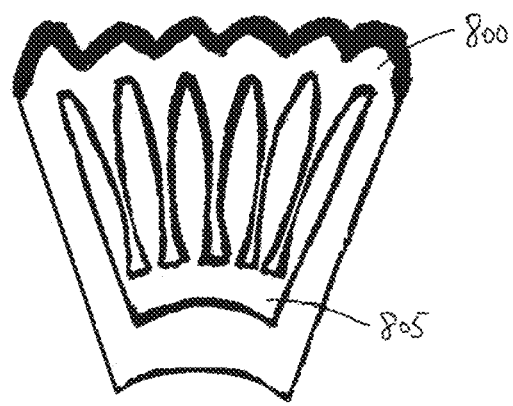
FIGS. 14(a) and (b) illustrate multi-directional bending of a thumb actuator in accordance with some embodiments.
Figure 14B:
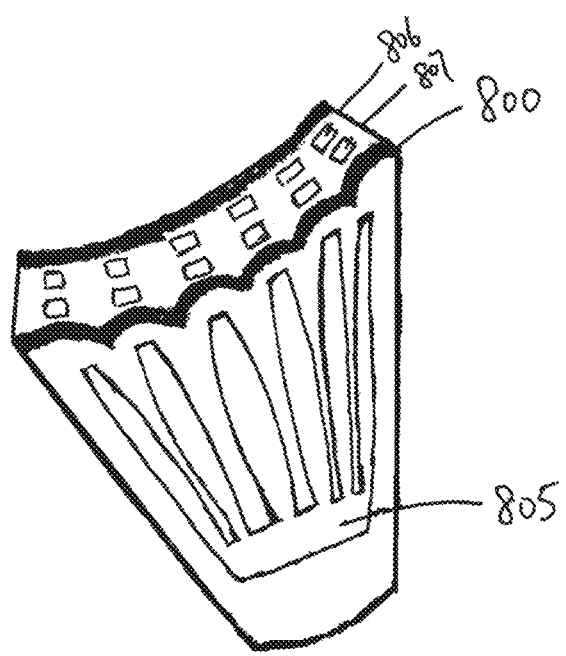
Figure 15A:
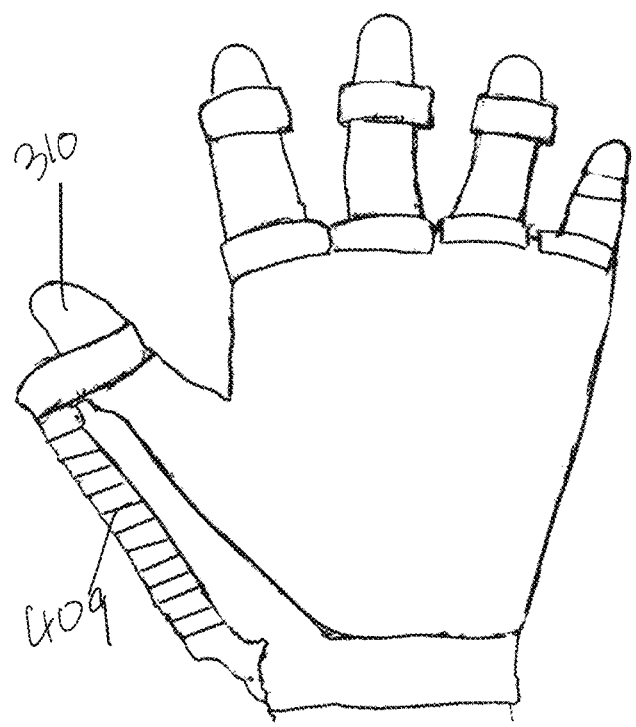
FIGS. 15(a), (b), and (c) are images of an experimental protype exoskeleton flexible hand of the present invention.
Figure 15B:
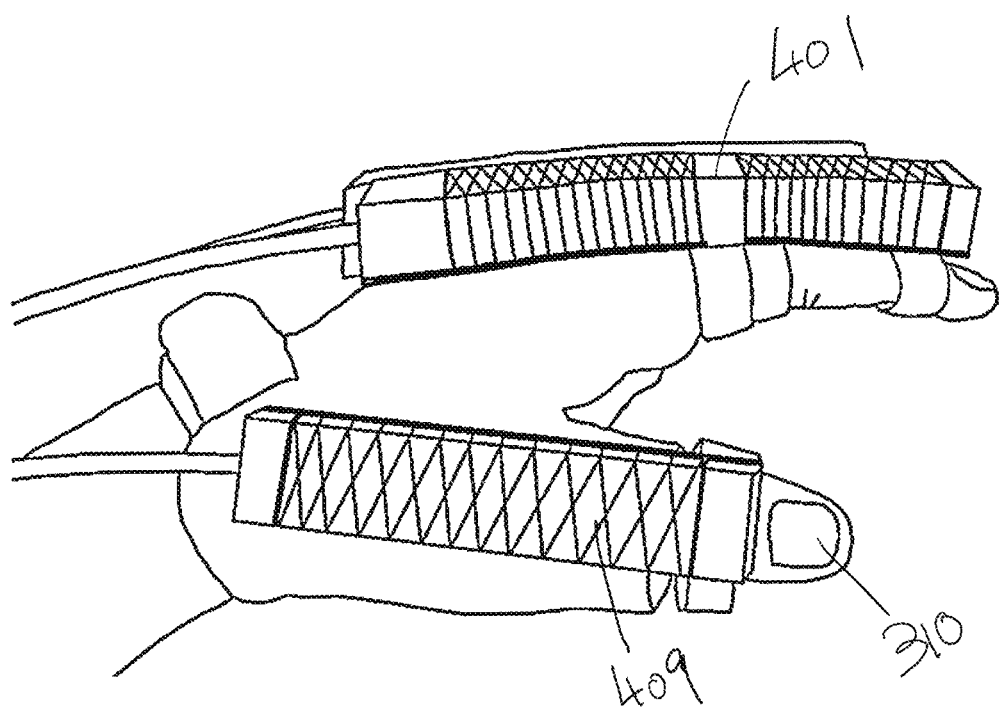
Figure 15C:
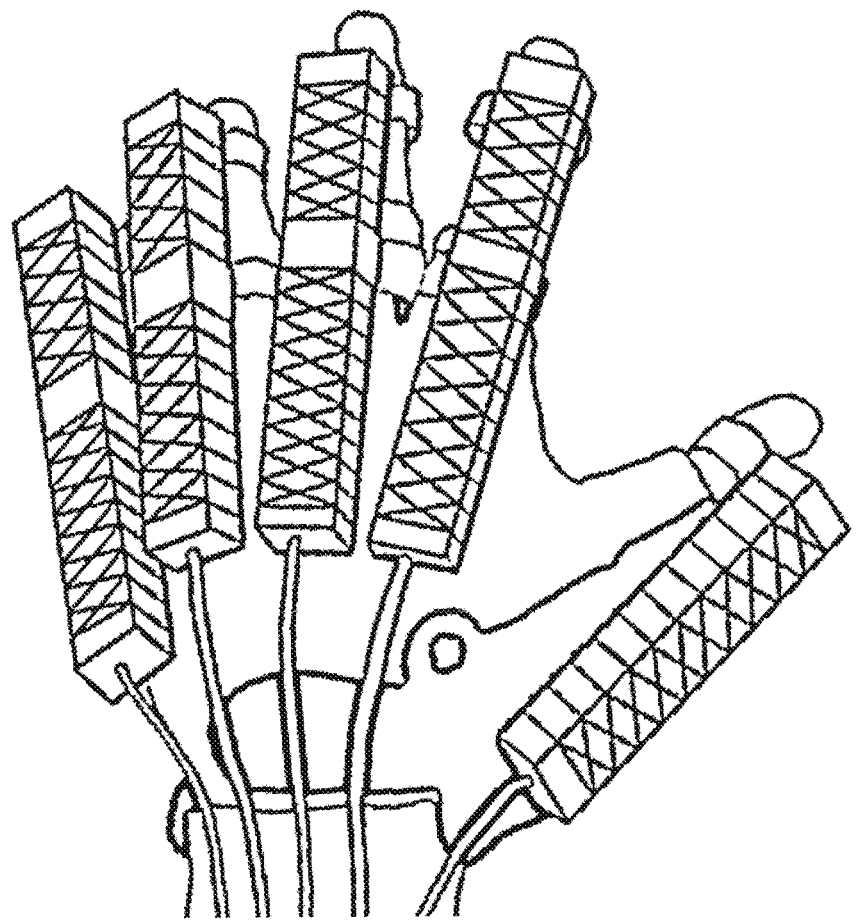
Figure 16:
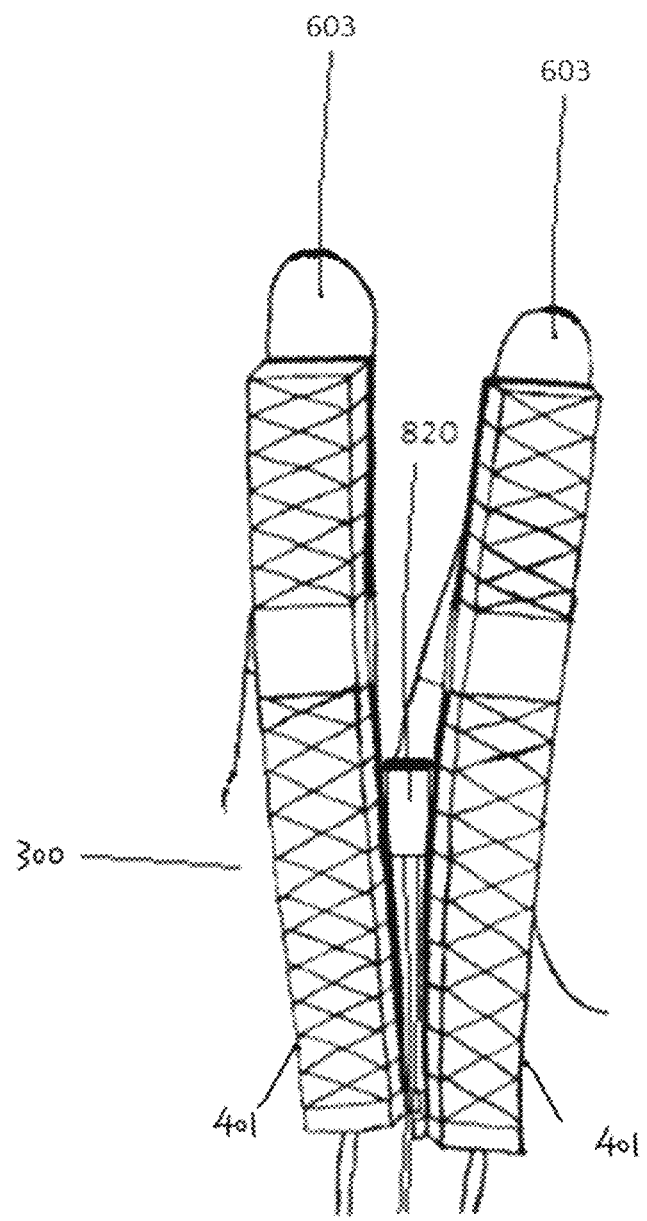
FIG. 16 illustrates the position of a finger spreading actuator according to an embodiment of the present invention.

Because of the nature of the plurality of connected pressurizing chambers, no mesh support needs to be embedded into the thumb joint actuator 800 for performing the bending or curling action. FIG. 14(a) shows the bending motion along the reinforcement band 801 upon pressurization of both layers of the chambers 806, 807. In FIG. 14(b), upon pressurization of the selected layer 807, the thumb joint actuator bends toward the unpressurized layer 806 and, at the same time, along the pressurized layer 807. Therefore, by swapping the pressurization between the two layers 806, 807, multi-directional bending on the thumb joint actuator 800 can be achieved and give the capability of moving the thumb in all directions.

Basic components of the whole control unit include a pressure source 307, solenoid valves 308, pressure sensors 311, and at least one micro-controller or microprocessor 309 for processing the control signals and controlling the pressure to the exoskeleton flexible hand. The pressure source 307 for the pressurization of the exoskeleton flexible hand 300 may be a pump, or any disposable or non-disposable compressed medium including, for example, a carbon dioxide bottle, oxygen tank, compressed nitrogen or compressed air. A pressure regulator can be provided to maintain a constant pressure coming from the pressure source 307.

The solenoid valves 308 can be controlled by either the micro-controller or microprocessor 309. The micro-controller or microprocessor 309 determines the activation period of the solenoid valves 308 from electronic signal inputs, which can be bio-signals that are acquired from different parts of the human body. Examples of capturing bio-signals include detecting electromyography (EMG) signals from the forearm muscles. Electrodes can be attached on specific groups of muscles. When the recorded EMG signal amplitude is greater than a defined threshold (e.g., 20% of the amplitude of the maximum voluntary contraction (MVC)), the micro-controller or microprocessor 309 can instruct the solenoid valves 308 to open. Another specific group of muscles can be targeted for switching off the solenoid valves 308 by following the same principles.

The exoskeleton flexible hand can also be controlled by electroencephalogram (EEG) signals from the scalp. Electrodes can be attached around the head to capture the Mu wave signals of the brain. When Mu expression is detected (e.g., a 20% drop from the resting state), the micro-controller or microprocessor 309 can have the solenoid valves 308 open. Following the occurrence of Mu expression, the solenoid valves 308 can be switched off using the same principles.

The solenoid valves 308 can provide a pressure inlet 310 to the exoskeleton flexible hand 300 when instructed to be switched on by the micro-controller or microprocessor 309. Real time pressure values from the pressure sensors 311, and the bending angle 312 of the finger actuators 401, 409 can both be recorded for the control algorithm to determine if the hand is holding an object. If the bending angle remains unchanged after a period of time (e.g., 2 seconds), but the pressure continued to increase in the finger actuators 401, 409, this can indicate to the microcontroller that an object has been grasped. The solenoid valves 308 can then be switched off and pressure maintained. The recording of bio-signals can continue after the solenoid valves 308 are turned off, forming a closed-loop control unit for the exoskeleton flexible hand 300.

The subject invention includes, but is not limited to, the following exemplified embodiments.

Embodiment 101

A robotic hand, grasping and/or extension apparatus (or an exoskeleton hand) comprising:
a finger actuator that is flexible and having a cavity (or balloon), a length, and a width;
a means for fluid communication with the cavity; and
a pressure source for supplying a pressurized fluid to the cavity (and/or pulling a vacuum to remove the fluid).

Embodiment 102

The apparatus of Embodiment 101, wherein the finger actuator has a reinforcement band or bands on a bottom surface (impregnated within the structure or attached to its surface) that restricts the expansion of the finger actuator on the bottom surface (allowing the top of the structure to expand relatively and creating a contraction or grasping motion). The reinforcement band or bands can also compensate for joint torque in spastic fingers.

Embodiment 103

The apparatus of any of Embodiments 101 to 102, wherein the finger actuator has one, or two, or three, or four, or five (or multiple) cavities that are separated widthwise (creating multiple sub-cavities each spanning the length of the finger actuator). Each of the sub-cavities can have its own pressure source such that, for example, a top sub-cavity can be pressurized (and expand) relative to a bottom cavity, causing the finger actuator to curl or grasp.

Embodiment 104

The apparatus of any of Embodiments 101 to 103, wherein the finger actuator has two or three (or multiple) joint-cavities that are separated lengthwise (having multiple sub-cavities each contributing to the overall length of the finger actuator) having and joints (areas of the actuators where there is no cavity) in between. The joint-cavities can be in fluid communication using independent tubing or through passages in the finger actuator. The joint-cavities can correspond to each of the metacarpophalangeal joint (MCP)—the joint at the base of the finger, the proximal interphalangeal joint (PIP)—the joint in the middle of the finger, and the distal interphalangeal joint (DIP) of each of the index finger, middle finger, ring finger, and small finger (or pinky) of the human hand. In the case of the thumb, the joint-cavities can correspond to each of the Carpometacarpal (CMC) Joint, Metacarpophalangeal (MP) Joint, and Interphalangeal (IP) Joint.

Embodiment 105

The apparatus of any of Embodiments 101 to 104, wherein the finger actuator includes a structural mesh. The structural mesh can include lengthwise filaments, widthwise filaments, and/or a patterned mesh (such as a net mesh or a double helical mesh).

Embodiment 106

The apparatus of any of Embodiments 101 to 105, wherein multiple finger actuators are provided corresponding to each of the thumb, index finger, middle finger, ring finger, and pinky finger.

Embodiment 107

The apparatus of any of Embodiments 101 to 106, further comprising a finger spreading actuator. The finger spreading actuator can be between any two fingers (including, for example, the index finder and middle finger, index and ring finger, etc.).

Embodiment 108

The apparatus of any of Embodiments 101 to 107, further comprising a thumb joint actuator. The thumb joint actuator can separate the thumb and index finger and also turn the thumb to oppose the fingers. The thumb joint actuator can include a reinforcement band on its bottom. The thumb joint actuator can include multiple cavities including a top layer cavity (or cavities) and a bottom layer cavity (or cavities). The bottom and top cavities can be in fluid communication such that one pressure source can expand the thumb joint actuator and separate the thumb and index finger. In an alternative embodiment, the top and bottom cavities can have separate pressure sources such that the top expands relative to the bottom and causes the thumb to turn and oppose the remaining fingers. The top and bottom cavity each can have a comb-like structure (see FIG. 13).

Embodiment 109

The apparatus of any of Embodiments 101 to 108, wherein the finger actuators and thumb actuator (and, if included, the thumb joint actuator) are secured onto a glove (which can be placed on a human hand).

Embodiment 110

The apparatus of any of Embodiments 101 to 109, wherein the finger and thumb actuators (and, if included, the thumb joint actuator) include an adhesive on the bottom surface (which can be secured on a hand or grasping structure).

Embodiment 111

The apparatus of any of Embodiments 101 to 110 wherein the means for fluid communication is a tube.

Embodiment 112

The apparatus of any of Embodiments 101 to 111, further comprising an angle sensor(s) at one or more places on the finger actuator (e.g., at the MCP, PIP, CMC, MP, IP and DIP joints.) Another angle sensor can be provided to measure the opposition angle of the thumb relative to the remaining fingers.

Embodiment 113

The apparatus of any of Embodiments 101 to 112, further comprising a valve(s) (e.g. a solenoid valve) for controlling pressure to the cavities (or balloons) of the actuators. This can include the actuators for each of the fingers, the thumb, finger spreading actuators, and the thumb joint actuator.

Embodiment 114

The apparatus of any of Embodiments 101 to 113, further comprising a microcontroller (or microprocessor) that controls pressure to the cavities. The microcontroller can also have angle sensors as inputs. Inputs to the microcontroller can also include pressure signals, solenoid valves and fluid sources on-off signals, and even signals from electromyography (EMG) or electroencephalography (EEG) sensors.

Embodiment 115

The apparatus of any of Embodiments 101 to 114, further comprising EMG sensors and/or EEG sensors.

Embodiment 116

The apparatus of any of Embodiments 101 to 115, wherein the cross-section of the finger actuator is spherical, hemispherical, rectangular, a square, or a polygon.

Embodiment 117

The apparatus of any of Embodiments 101 to 116, wherein the actuators are in a straight position when its cavities have no pressure (and can provide force to straighten a paralyzed patient's hand).

Embodiment 118

The apparatus of any of Embodiments 101 to 117, wherein one or more of the actuators have narrowed portions (in which the diameter or thickness of the actuator is less than the rest of the actuator) to promote bending at certain locations and reduce the force required for the actuators to bend (not shown).

Embodiment 119

The apparatus of any of Embodiments 101 to 118, wherein a reinforcement band is provided internally (e.g. extending through the center of the apparatus as shown in FIG. 6).

Embodiment 120

A method of implementing a robotic hand comprising providing any of the apparatuses of Embodiments 101 to 119.

Embodiment 201. 1

A flexible actuator with a force compensating component comprising:
a deformable elastomer balloon providing motion upon pressurization;
a reinforcement band that extends along to a portion of the elastomer balloon, wherein the force compensating reinforcing band is to exert the same magnitude of compensating force on the balloon to compensate for the external forces trying to alter the shape of the elastomer balloon, and therefore to restrict the change of position of the elastomer balloon.

Embodiment 202

The flexible actuator of Embodiment 201, wherein the position of the elastomer balloon changes as soon as the sum of force generated upon pressurization of the elastomer balloon and the external forces are larger than the maximum force that the reinforcement band can provide, defined as the threshold activation force.

Embodiment 203

The flexible actuator of any of Embodiments 201 to 202, wherein the maximum stress on the reinforcement band is lower than the yield strength, thereby restricting the motion of the elastomer balloon to deform the reinforcement band together in the same direction only elastically but not plastically to assure the ability of returning to pre-deformed initial position or shape.

Embodiment 204

The flexible actuator of any of Embodiments 201 to 203, wherein the material model of the elastomer balloon is linearized from hyper-elastic to follow the linear stress-strain relationship of the reinforcement band, defined by the Young's modulus of the reinforcement band.

Embodiment 205

The flexible actuator of any of Embodiments 201 to 204, wherein the reinforcement band is comprised of elastic materials with a durometer higher than the elastomer balloon.

Embodiment 206

The flexible actuator of any of Embodiments 201 to 205, wherein the materials adopted for the reinforcement band can change shape or stress-strain relationship properties upon temperature variations and can alter the pre-deformed initial position (or shape) of the elastomer balloon to others at unpressurized situation.

Embodiment 207

The flexible actuator of any of Embodiments 201 to 206, wherein the reinforcement band can be covered by at least one flexible sensors quantifying the motion of the elastomer balloon in terms of any physical quantities.

Embodiment 208

The flexible actuator of any of Embodiments 201 to 207, wherein the shape of the elastomer balloon and the reinforcement band is arbitrarily designed.

Embodiment 209

The flexible actuator of any of Embodiments 201 to 208, wherein the inner cavity of the elastomer balloon is divided into at least one isolated chamber for receiving at least one pressure inlet.

Embodiment 210

The flexible actuator of any of Embodiments 201 to 209, wherein the motion of bending, extension, twisting, or expansion are defined accordingly with the pattern shape of the structural mesh support, or the division of the inner cavity of the elastomer balloon.

Embodiment 211

The flexible actuator of any of Embodiments 201 to 210, wherein the structural mesh support is inextensible and strain-limiting at the region of the elastomer balloon that adhered to the mesh support.

Embodiment 301

An exoskeleton flexible hand comprising:
at least one finger actuator corresponding to one human finger, wherein each of the finger actuator comprises at least one flexible actuator corresponding to at least one finger joint on human fingers.
a control unit to manipulate the pressure inlet to at least one finger actuator; and
at least one pressure inlet for the communication between at least one finger actuator and control unit.

Embodiment 302

The exoskeleton flexible hand of Embodiment 301, wherein five finger actuators cover across at least one finger joint on each of the five human fingers for each of the finger actuators, and wherein at least one pressure inlet is in communication with the finger actuators.

Embodiment 303

The exoskeleton flexible hand of any of Embodiments 301 to 302, wherein the reinforcement band of the flexible actuator is configured to assist in extending an impaired flexed finger upon depressurization.

Embodiment 304

The exoskeleton flexible hand of any of Embodiments 301 to 303, wherein five finger actuators are configured to bend towards the reinforcement band upon pressurization to assist in grasping with one's hand.

Embodiment 305

The exoskeleton flexible hand of any of Embodiments 301 to 304, further including at least one thumb joint actuator that includes at least one flexible actuator.

Embodiment 306

The exoskeleton flexible hand of any of Embodiments 301 to 305, wherein at least one thumb joint actuator is placed around the thumb joint on the human hand to facilitate the capability of moving in all directions for the thumb.

Embodiment 307

The exoskeleton flexible hand of any of Embodiments 301 to 306, wherein the five finger actuators and at least one thumb joint actuator are attached to a wearable glove together for full hand function.

Embodiment 308

The exoskeleton flexible hand of any of Embodiments 301 to 307, wherein the control unit includes a pump, or connection with any disposable or non-disposable compressed medium for the pressurizing source.

Embodiment 309

The exoskeleton flexible hand of any of Embodiments 301 to 308, wherein the change in bio-signals captured on one's body, e.g. EMG, EEG, etc. can be used as an indicator to control the pressure inlet to the finger actuators.

Embodiment 310

The exoskeleton flexible hand of any of Embodiments 301 to 309, wherein the control unit has at least one pressure sensor to monitor the pressure inside the finger actuators.

Embodiment 311

The exoskeleton flexible hand of any of Embodiments 301 to 310, wherein the bending angle of the five finger actuators is detected by the flexible sensors on the reinforcement band of the flexible actuator.

Embodiment 312

The exoskeleton flexible hand of any of Embodiments 301 to 311, wherein the control algorithms stops the motion of hand grasping or opening by detecting if there is no change in bending angle after a period of time to maintain the finger posture.

Embodiment 401

A method for implementing a robotic hand comprising:
providing a finger actuator that is flexible and having a cavity (or balloon);
providing a means for fluid communication with the cavity;

attaching the finger actuator to a human finger or like structure (e.g., a robotic hand frame); and injecting a fluid into (or removing from) the cavity to curl (or straighten) the finger actuator. This can be used, for example, to grasp or release an object.

Embodiment 402

The method of Embodiment 401, further comprising providing a reinforcement band (or other means to restrict expansion) on a bottom surface (impregnated within the structure or attached to its surface) of the finger actuator, and having the top of the finger actuator expand relative to the bottom of the finger actuator and creating a curling, contracting, or grasping motion.

Embodiment 403

The method of any of Embodiments 401 to 402, wherein the finger actuator has one, or two, or three, or four, or five (or multiple) cavities that are separated widthwise (creating multiple sub-cavities each spanning the length of the finger actuator). Each of the sub cavities can have its own pressure source such that a top sub-cavity can be pressurized (and expand) relative to a bottom cavity causing the finger actuator to curl or grasp. As seen in FIG. 4, the top one or two cavities can be pressurized relative to the bottom cavity, creating expansion on the top relative to the bottom and causing the finger actuator to bend, curl or grasp.

Embodiment 404

The method of any of Embodiments 401 to 403, wherein the finger actuator has two, or three (or multiple) joint-cavities that are separated lengthwise (having multiple sub-cavities each contributing to the overall length of the finger actuator) and joints in between (see FIG. 7(a)). The joint-cavities can be in fluid communication using independent tubing or through passages integrally formed in the finger actuator. The joint-cavities can correspond to each of the metacarpophalangeal joint (MCP)—the joint at the base of the finger, the proximal interphalangeal joint (PIP)—the joint in the middle of the finger, and the distal interphalangeal joint (DIP) of each of the index finger, middle finger, ring finger, and small finger (or pinky) of the human hand. In the case of the thumb, the joint-cavities can correspond to each of the Carpometacarpal (CMC) Joint, Metacarpophalangeal (MP) Joint, and Interphalangeal (IP) Joint. The cavities can be above the joints of the hand, between the joints of the hand, or both. The method allows for distinct sections of the finger actuator to expand (at the location of the cavities) while sections without cavities remain relatively contracted.

Embodiment 405

The method of any of Embodiments 401 to 404, further comprising restricting and/or reinforcing portions of the finger actuator using filaments (e.g., using a structural mesh). A structural mesh can include lengthwise filaments, widthwise filaments, and/or a patterned mesh (such as a net mesh or a double helical mesh).

Embodiment 406

The method of any of Embodiments 401 to 405, further comprising providing multiple finger actuators corresponding to each of the thumb, index finger, middle finger, ring finger, and pinky finger.

Embodiment 407

The method of any of Embodiments 401 to 406, further comprising spreading multiple finger actuators. The multiple finger actuators can be spread using a finger spreading actuator between any two fingers.

Embodiment 408

The method of any of Embodiments 401 to 407, further comprising providing a thumb joint actuator that can spread the thumb from the index finger and also cause the thumb to turn and oppose the fingers. The thumb joint actuator can include a cavity and a reinforcement band on its bottom. The thumb joint actuator can include multiple cavities including a top layer cavity (or cavities) and a bottom layer cavity (or cavities). The bottom and top cavities can be in fluid communication such that one pressure source can expand the thumb joint actuator and separate the thumb and index finger. In an alternative embodiment, the top and bottom cavities can have separate pressure sources such that the top expands relative to the bottom and causes the thumb to turn and oppose the remaining fingers. The top and bottom cavity can each have a comb-like structure and multiple layers (see FIG. 13).

Embodiment 409

The method of any of Embodiments 401 to 408, wherein the finger actuators (and, if included, the thumb joint actuator) are secured onto a glove (which can be placed on a human hand).

Embodiment 410

The method of any of Embodiments 401 to 409, wherein the finger actuators (and, if provided, the thumb joint actuator) include an adhesive on the bottom surface (which can be secured on a hand or robotic hand frame).

Embodiment 411

The method of any of Embodiments 401 to 410, wherein the means for fluid communication is a tube.

Embodiment 412

The method of any of Embodiments 401 to 411, further comprising an angle sensor or sensors at one or more places on the finger actuator (e.g., at the MCP, PIP, CIVIC, MP, IP and DIP joints.) Another angle sensor can be provided to measure the opposition angle of the thumb relative to the remaining fingers.

Embodiment 413

The method of any of Embodiments 401 to 412, further comprising a valve(s) (e.g. a solenoid valve) for controlling pressure to the cavities (or balloons). This can include the actuators for each of the fingers and the thumb, the thumb joint actuator, and finger spreading actuators.

Embodiment 414

The method of any of Embodiments 401 to 413, further comprising providing a microcontroller that controls pressure to the cavities. The microcontroller can also have angle sensors as inputs. Inputs to the microcontroller can also include pressure signals, solenoid valves and fluid sources on-off signals, and even signals from electromyography (EMG) or electroencephalography (EEG) sensors.

Embodiment 415

The method of any of Embodiments 401 to 414, further comprising providing biosignal detectors (e.g. EMG sensors and/or EEG sensors) that are in communication with the microcontroller (or microprocessor) and attached to a user (or patient). The EMG and/or EEG sensors can then be used to control the robotic hand (e.g., via a microcontroller). Specific examples of signals that can be captured using EEG signals include Mu waves.

Embodiment 416

The method of any of Embodiments 401 to 415, wherein the cross-section of the finger actuator is spherical, hemi-spherical, rectangular, a square, or a polygon.

Embodiment 417

The method of any of Embodiments 401 to 416, further comprising providing a gas to the cavities (of the finger actuators, fingers spreading actuators, or thumb actuator) as a pressure source using a valve (e.g. a solenoid valve). The gas can be recycled (drawn in and out of the cavities) using, for example, a plunger or positive displacement pump. The compressed gas can also conic from a compressed gas source (e.g., nitrogen, carbon dioxide, or compressed air) and can be discharged to the atmosphere. The pressure source can include a pressure regulator prior to the control valve to maintain consistent performance.

Embodiment 418

The method of any of Embodiments 401 to 417, further comprising providing a liquid to the cavities (of the finger actuators, fingers spreading actuators, or thumb actuator) as a pressure source. The liquid can be recycled (drawn in and out of the cavities) using, for example, a plunger or pump. For example, the liquid can be water, hydraulic fluid, or mineral oil.

Embodiment 419

The method of any of Embodiments 401 to 417, further comprising simultaneously pressurizing a cavity and taking joint angle measurements; determining when increasing pressure no longer results in a change in the joint angle measurement; and stopping the increase in pressure (or maintaining the pressure). This can correspond to when an object has been grasped by the robotic hand. The microcontroller (or microprocessor) can be programmed to determine grasping strength by specifying the amount of pressure injected into the cavities.

Embodiment 501

A flexible actuator comprising:
an elastomer balloon that is flexible and having a cavity, a length, and a width;
a force compensation component;
a reinforcement band for the force compensating component to provide a threshold activation force to the flexible actuator;
a means for fluid communication with the cavity; and
a pressure source for supplying a fluid to the cavity.

Embodiment 502

The flexible actuator of Embodiment 501, wherein exoskeleton flexible hand includes multiple flexible actuators that are provided corresponding to each of the thumb, index finger, middle finger, ring finger, and pinky finger.

Embodiment 503

The flexible actuator of any of Embodiments 501 to 502, wherein increasing the pressure in the cavity and the external force causes the generated force on the flexible actuator to be over the threshold activation force, thereby causing the flexible actuator to change the shape.

Embodiment 504

The flexible actuator of any of Embodiments 501 to 503, wherein the threshold activation force is adjusted to compensate for the external force that trying to alter the pre-deformed initial shape of the flexible actuator at an unpressurized state.

Embodiment 505

The flexible actuator of any of Embodiments 501 to 504, wherein the shape of the flexible actuator at an unpressurized state is adjustable when the reinforcement band or bands possess shape memory effect.

Embodiment 506

The flexible actuator of any of Embodiments 501 to 505, wherein the threshold activation force is related to the selection of materials or the geometry for a reinforcement band.

Embodiment 507

The flexible actuator of any of Embodiments 501 to 506, wherein deformation of the flexible actuator follows the stress-strain relationship of a reinforcement band, thereby restricting the flexible actuator to elastically change the shape.

Embodiment 508

The flexible actuator of any of Embodiments 501 to 507, wherein a reinforcing band is an elastic material with a durometer higher than the elastomer balloon.

Embodiment 509

The flexible actuator of any of Embodiments 501 to 508, wherein the flexible actuator has a flexible angle sensor that quantifies the bending angle of the flexible actuator upon pressurizing the cavity of the flexible actuator.

Embodiment 510

The flexible actuator of any of Embodiments 501 to 509, wherein the flexible actuator has a flexible strain sensor that quantifies the strain induced on the flexible actuator upon pressurizing the cavity of the flexible actuator.

Embodiment 511

The flexible actuator of any of Embodiments 501 to 510, wherein the flexible actuator has at least one cavity, or multiple sub-cavities that are separated widthwise and run and overlap lengthwise.

Embodiment 512

The flexible actuator of any of Embodiments 501 to 511, wherein the flexible actuator has one or multiple joint-cavities that are separated lengthwise;

Embodiment 513

The flexible actuator of any of Embodiments 501 to 512, wherein the means for securing a flexible actuator to a finger is a glove or adhesive surface.

Embodiment 514

The flexible actuator of any of Embodiments 501 to 513, wherein the flexible actuators on the exoskeleton flexible hand have a reinforcement band on a bottom surface that compensates for joint torques in spastic flexed fingers.

Embodiment 515

The flexible actuator of any of Embodiments 501 to 514, wherein the flexible actuator includes a structural mesh.

Embodiment 516

The flexible actuator of any of Embodiments 501 to 515, wherein the structural mesh is a double helical mesh.

Embodiment 517

The flexible actuator of any of Embodiments 501 to 516, wherein the exoskeleton flexible hand further provides a thumb joint actuator, and engaging the thumb joint actuator to have the thumb turn and oppose the index finger, middle finger, ring finger, and pinky finger.

Embodiment 518

The flexible actuator of any of Embodiments 501 to 517, wherein the exoskeleton flexible hand further comprises a finger spreading actuator.

Embodiment 519

The flexible actuator of any of Embodiments 501 to 518, further comprising a solenoid valve for controlling pressure to the cavity of the flexible actuator.

Embodiment 520

The flexible actuator of any of Embodiments 501 to 519, further comprising a microcontroller or microprocessor that has angle signals, pressure signals, solenoid valves and fluid sources on-off signals, and electromyography (EMG) or electroencephalography (EEG) signals as inputs.

Embodiment 521

The flexible actuator of any of Embodiments 501 to 520, wherein the fluid includes a disposable gas or a disposable liquid.

It should be understood that the examples and embodiments described herein are for illustrative purposes only and that various modifications or changes in light thereof will be suggested to persons skilled in the art and are to be included within the spirit and purview of this application.

We claim:
1. A joint manipulation apparatus comprising:
a flexible bending actuator having an elastomer structure with a cavity, a length, and a width, and having a reinforcement band that is a metal plate attached on a surface of the elastomer structure, wherein the reinforcement band is configured to provide a balancing torque that straightens the elastomer structure to counterbalance a joint torque in flexion from a spastic finger and provide a threshold activation torque that is opposite to a torque direction from the flexible bending actuator when the flexible bending actuator is pressurized, such that the reinforcement band is configured so that when a threshold activation force is greater than a sum of the joint torque in flexion from the spastic finger on the elastomer structure and a pressurization force generated for the bending motion of the elastomer structure upon fluid injection of the flexible bending actuator, a straightening force equal to the threshold activation torque is provided by the reinforcement band to move both the spastic flexed finger joint and the elastomer structure back to a pre-deformed initial shape, wherein the reinforcement band is a material with a stiffness that is higher than that of the elastomer structure, and wherein the threshold activation torque is controlled by a Young's Modulus of the metal plate and moment of inertia of the reinforcement band;
a means for fluid communication with the cavity;
exactly one pressure source for supplying the fluid to the cavity; and
a means for securing the flexible bending actuator to a hand.
2. The apparatus of claim 1, wherein multiple flexible bending actuators are provided forming a finger actuator.
3. The apparatus of claim 2, wherein multiple finger actuators are provided corresponding to each of the thumb, index finger, middle finger, ring finger, and pinky finger.
4. The apparatus of claim 2, further comprising a finger spreading actuator.
5. The apparatus of claim 1, wherein the flexible bending actuator has multiple joint-cavities that are separated lengthwise.
6. The apparatus of claim 1, wherein the flexible bending actuator includes a structural mesh.
7. The apparatus of claim 6, wherein the structural mesh is a double helical mesh.
8. The apparatus of claim 1, further comprising an angle sensor within the flexible bending actuator.
9. The apparatus of claim 1, further comprising a solenoid valve for controlling pressure to the cavity of the flexible bending actuator.
10. The apparatus of claim 1, further comprising a microcontroller that has angle signals, pressure signals, and biological signals as inputs.

* * * * *